United States Patent
Jakobson

(10) Patent No.: US 8,032,297 B2
(45) Date of Patent: Oct. 4, 2011

(54) METHOD AND SYSTEM FOR DISPLAYING NAVIGATION INFORMATION ON AN ELECTRONIC MAP

(76) Inventor: Gabriel Jakobson, Las Vegas, NV (US)

( * ) Notice: Subject to any disclaimer, the term of this patent is extended or adjusted under 35 U.S.C. 154(b) by 590 days.

(21) Appl. No.: 12/151,827

(22) Filed: May 8, 2008

(65) Prior Publication Data

US 2009/0281720 A1    Nov. 12, 2009

(51) Int. Cl.
*G01C 21/00* (2006.01)
*G06F 17/30* (2006.01)

(52) U.S. Cl. ... 701/202; 701/208; 701/212; 340/995.14; 715/785

(58) Field of Classification Search ............... 701/202, 701/211, 213, 212, 208; 340/995.14, 995.21, 340/995.27; 715/785, 764
See application file for complete search history.

(56) References Cited

U.S. PATENT DOCUMENTS

| | | | |
|---|---|---|---|
| 5,220,507 A * | 6/1993 | Kirson | 701/202 |
| 6,199,012 B1 * | 3/2001 | Hasegawa | 701/208 |
| 6,266,612 B1 | 7/2001 | Dussell | |
| 6,415,224 B1 * | 7/2002 | Wako et al. | 701/208 |
| 6,542,814 B2 * | 4/2003 | Polidi et al. | 701/208 |
| 6,587,782 B1 | 7/2003 | Nocek | |
| 6,954,697 B1 | 10/2005 | Smith | |
| 7,054,743 B1 | 5/2006 | Smith | |
| 7,324,896 B1 | 1/2008 | Smith | |
| 7,359,798 B2 * | 4/2008 | Nagamasa | 701/208 |
| 7,490,004 B2 * | 2/2009 | Kimura | 701/201 |
| 7,698,062 B1 * | 4/2010 | McMullen et al. | 701/211 |
| 2005/0085999 A1 * | 4/2005 | Onishi | 701/211 |
| 2007/0050129 A1 * | 3/2007 | Salmre | 701/207 |
| 2008/0228386 A1 * | 9/2008 | Geelen et al. | 701/201 |

* cited by examiner

*Primary Examiner* — Tan Q Nguyen

(57) ABSTRACT

A mapping systems includes determining that a map object ("MO") is outside the visible area of a map displayed; calculating the direction, distance and travel-time to the MO, creating an object vector indicator ("OVI") and displaying the OVI on the map-display application. The OVI may be displayed on the periphery of the map-display and may be positioned in the general direction of the MO. The position of the electronic device is factored into the calculations and placement of the OVI.

30 Claims, 23 Drawing Sheets

METHOD AND SYSTEM FOR DISPLAYING NAVIGATION INFORMATION ON AN ELECTRONIC MAP

FIELD OF INVENTION

The present invention relates to mapping on electronic devices. More particularly, the present invention relates to displaying information pertaining to map-objects (e.g. points-of-interest, way-points, etc.) that are outside the visible area of a map, within a map-display application.

BACKGROUND OF THE INVENTION

Popular mapping services include Google® Maps, Yahoo!® Maps, Windows Live Search Maps®, MapQuest®, etc. for personal computers and computing devices, and Garmin®, Magellan®, TomTom® etc. as GPS-navigation units. Mapping services allow a user to view a map in various formats (e.g. 2D, 3D, aerial, road, etc.). Functionality provided includes "zoom in" and "zoom out", which allows the user to see a smaller region at a greater level of detail, and larger region in less detail, respectively.

In a digital mapping system, objects on a map may be demarcated by symbols indicating points-of-interest ("POI"), way-points ("WP"), locations, etc. (collectively referred to inhere as map-objects, or ("MO")) For example, the user may perform a search for a businesses and the search results may be displayed as symbols on a map, corresponding to the geographic location of the businesses in the result set of the search. In another common example, a user may request driving directions, in response to which way-points may be displayed on the map, corresponding to geographic points along the plotted route of the driving direction.

At present, one or more of the MOs to be displayed on the map may be outside an area of the map visible to the user (e.g. when the user zooms into an area of the map not including the MO.) The user often may not be able to discern the direction and distance to the MO which would be outside the visible area of the map, without (1) panning the map in the general direction of the MO until the visible area of the map includes the MO, and/or (2) zooming out until the visible area of the map includes the MO, and/or (3) in the case of a menu or a hyperlinked-list item referencing the MO, selecting the reference to the MO from the menu/the hyperlinked list item.

SUMMARY OF THE INVENTION

The present invention provides various methods, systems and apparatus for displaying information related to objects on a map (e.g. symbols denoting points-of-interest ("POI"), way-points ("WP"), etc.) collectively referred to inhere as map-objects ("MO") which are outside a visible area of the map. The visible area of the map may be determined by a map-display application displaying the map. MOs which are outside the visible area of the map (e.g. in response to a user's zooming into an area of the map, or panning the map—resulting in the exclusion of an area of the map containing a MO; or MOs generated in response to a user's search query and/or WPs as part of driving directions, etc., which are outside the visible area of the map) may be referenced by displaying object vector indicators ("OVI".)

An OVI may be displayed by the map-display application in conjunction with the area of the map displayed by the map-display application. In one embodiment, the OVI may be displayed at the periphery of the area of the map. The OVI may include information referencing the MO, as well as information on the MO's direction, distance, travel-time to the MO, estimated-time-of-arrival, etc. In various embodiments the MO's direction, distance, travel time, etc., may be calculated from the current geographic position of the user (e.g. determined via GPS); or alternatively, from an MO on the area of the map visible to the user, that is closest to the center of the visible area of the map; or from the MO selected by the user, etc. The OVI's position may change or be changed to correlate with the respective positions of the user and the MO referenced by the OVI. Information included in the OVI may change to correlate with the respective positions of the user and the MO the OVI references. An OVI may include symbols indicating the type of MO referenced, and may change in appearance, including a change in the information the OVI displays, in response to various factors such as a change in the coordinates of the user using the map-display application.

DESCRIPTION OF THE DRAWINGS

For a more complete understanding of the present invention and further advantages thereof, references are now made to the following Detailed Description, taken in conjunction with the drawings, in which.

DETAILED DESCRIPTION

Figure 1:
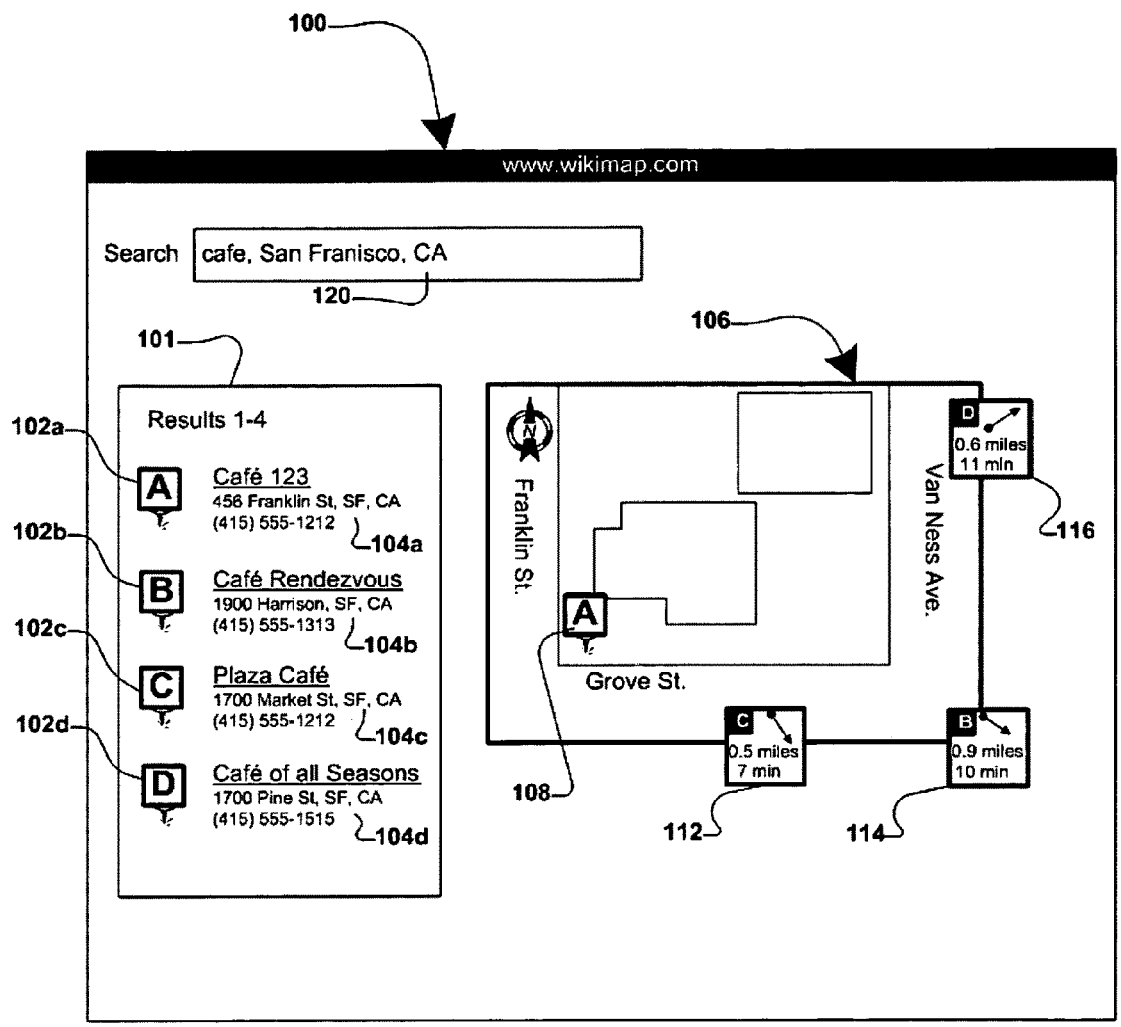
FIG. 1 is a generalized block diagram illustrating displaying object vector indicators ("OVI"), according to one embodiment of the present invention.

FIG. 1 is a generalized block diagram illustrating displaying object vector indicators ("OVI"), according to one embodiment of the present invention. A map display application 100 (e.g. an internet browser), on a computing device (e.g. a personal computer, a personal digital assistant, a cellular phone, etc.) may display a visible area of a map 106. The visible area of a map 106 may represent a small portion of a much larger virtual map—while the larger virtual map (e.g. the entire globe, continent, state, city, etc.) may be outside the display area and not visible to the user, the portion comprising the visible area of a map 106, may be visible to the user. The visible area of a map 106 may include location markers visible to the user. The map-display application 100 may also include references to location markers outside a visible area of a map 106.

For example, the user may input a search query 120 "café, San Francisco, Calif." and a search engine, accessible to the map-display application 100 (e.g. the search engine may be web-based, accessible to the map-display application 100 via the internet.) The visible area of a map 106 may be rendered in response to the user query 120 and a resulting list of locations 101.

In the prior art, the resulting list of locations 101 may include location marker identifiers 102a-102d, corresponding to the location markers' names and descriptions 104a-104d, respectively. The user may select a location marker identifier "A" 102a in response to which the visible area of a map 106 may re-render and/or zoom and/or pan in a manner allowing the corresponding location marker "A" 108 to be visible on the visible area of a map 106. The location marker "A" 108 on the visible area of a map 106 may correspond to the geographic location of the address of "Café 123" which is "456 Franklin St. San Francisco, Calif." 104a. In prior art, location markers corresponding to locations 104b-104d, whose geographic coordinates are outside of the visible area of a map 106, may not be displayed. Thus, the user may be unaware of the relative locations and distances of the location markers not visible on the visible area of a map 106.

In the presently-preferred embodiment of this invention, location markers outside the visible area of a map 106 may be referenced by OVIs, displayed to the user by the map-display application 100. The location marker identifiers "B" 102b, "C" 102c and "D" 102d, in the list of locations 101, may be referenced by the OVIs "B" 114, "C" 112 and "D" 116, respectively.

For example, the OVI "C" 112 may reference a remote location marker, not visible on the visible area of a map 106, corresponding to the geographic location of the location marker identifier "C" 102c, at location/address "1700 Market Street, San Francisco, Calif." 104c. Information displayed in the OVI "C" 112 may include a vector (e.g. arrow) pointing in the direction of the referenced remote location marker, the distance and travel time to the remote location marker, etc. Similarly, the other OVIs "B" 114 and "D" 116 may point to their corresponding remote (i.e. not visible to the user on the visible are of a map 106) location markers and may contain information about respective distances and travel times.

Please refer to FIGS. 2A-2D and FIGS. 3A-3C for more in-depth discussion of OVIs, the data they may contain and their placement on the visual display. FIGS. 6A and 6B, 8A-8C and 9A-9E describe various embodiments involving OVIs and their use in electronic maps.

Figure 2A:
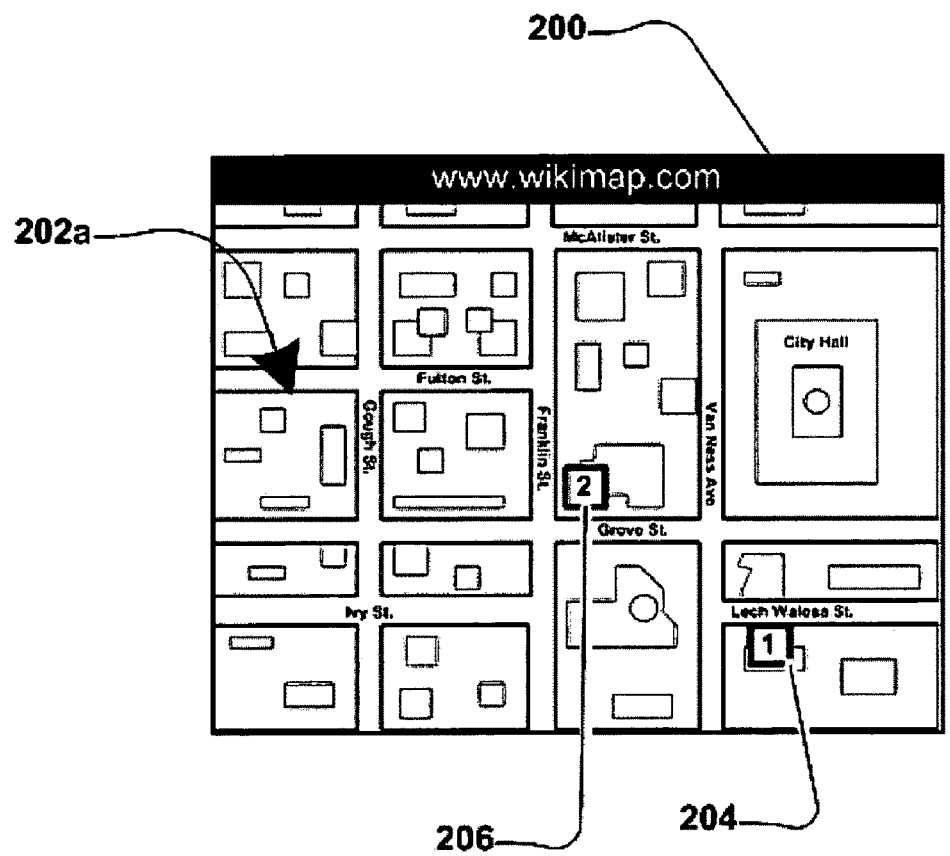
FIGS. 2A, 2B, 2C and 2D are generalized block diagrams illustrating displaying object vector indicators ("OVI"), according to various embodiments of the present invention.

FIGS. 2A, 2B, 2C and 2D are generalized block diagrams illustrating displaying object vector indicators ("OVI"), according to various embodiments of the present invention. Referring to FIG. 2A, a map display application 200, running on an electronic device (e.g. a personal computer, a cellular phone, a personal digital assistant, a GPS-navigation unit, etc.) may display a map region 202a. The map region 202a may include map-objects ("MO") such as location markers 204 and 206 (e.g. denoting landmarks, points-of-interest, way points, etc.)

The map region 202a may be defined as a portion of a larger map (e.g. map of the entire Planet Earth) visible to the user of the electronic device through the map-display application 200. The bounds of the geographic area shown in the map region 202a may be determined by the zoom-level of the map display application 200, the resolution and level-of-detail of the displayed map, etc.

Figure 2B:
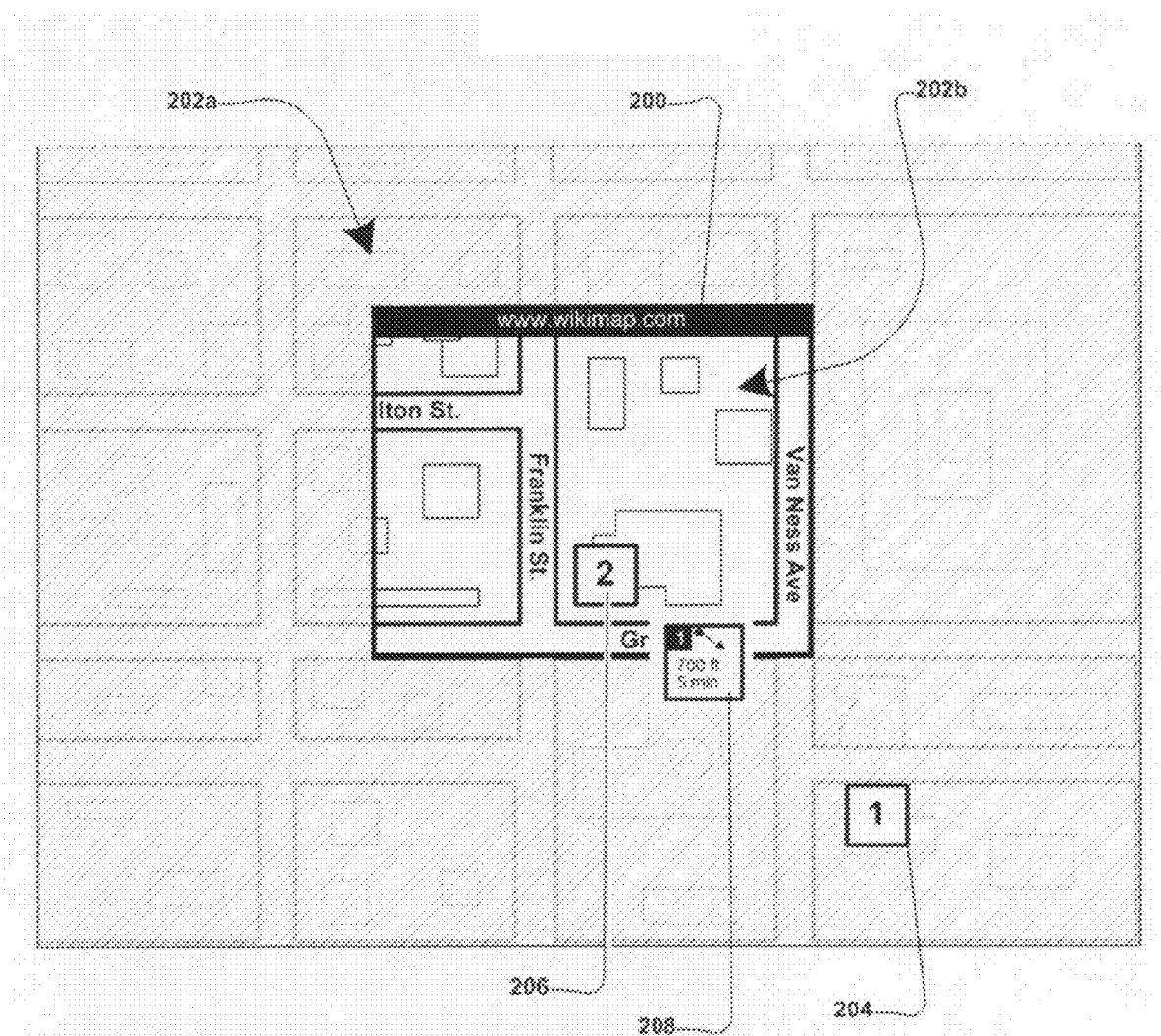

Referring now to FIG. 2B, the map-display application 200 may display a smaller map region 202b (e.g. in response to a user's zoom-in function, causing the map-display application 200 to display a smaller map region 202b at a greater level of detail.) For illustrative purposes, in this example, the map region 202a is shown cross-hatched, i.e. invisible to the user, with the map region 202b being a portion of map region 202a and visible to the user through the map-display application 200.

As the zoom level for the electronic device varies, not all location markers may be visible to the user through the map-display application 200. For example, the location marker 204 may not be visible to the user at a high zoom level, as it is outside the map region 202b visible in the map-display application 200. However, the Location marker 206 may be visible in the map-display application 200 as it is located within the map region 202b. At present, in the prior art, the user may see the location marker 206 and may not see the location marker 204, nor would the user receive a visual indication as to the direction and distance of the location marker 204 from the map region 202b (or in an alternate embodiment, the distance from the location marker 206, or any other point, on the map region 202b) displayed in the map-display application 200.

In the presently-preferred embodiment, an OVI 208 may be displayed in the map-display application 200. The OVI 208 may indicate to the user the direction from the location marker 206 to the location marker 204, the distance between the two location markers, the travel time from the location marker 206 to the location marker 204, etc. In alternate embodiments, the OVI 208 may contain other information.

Figure 2C:
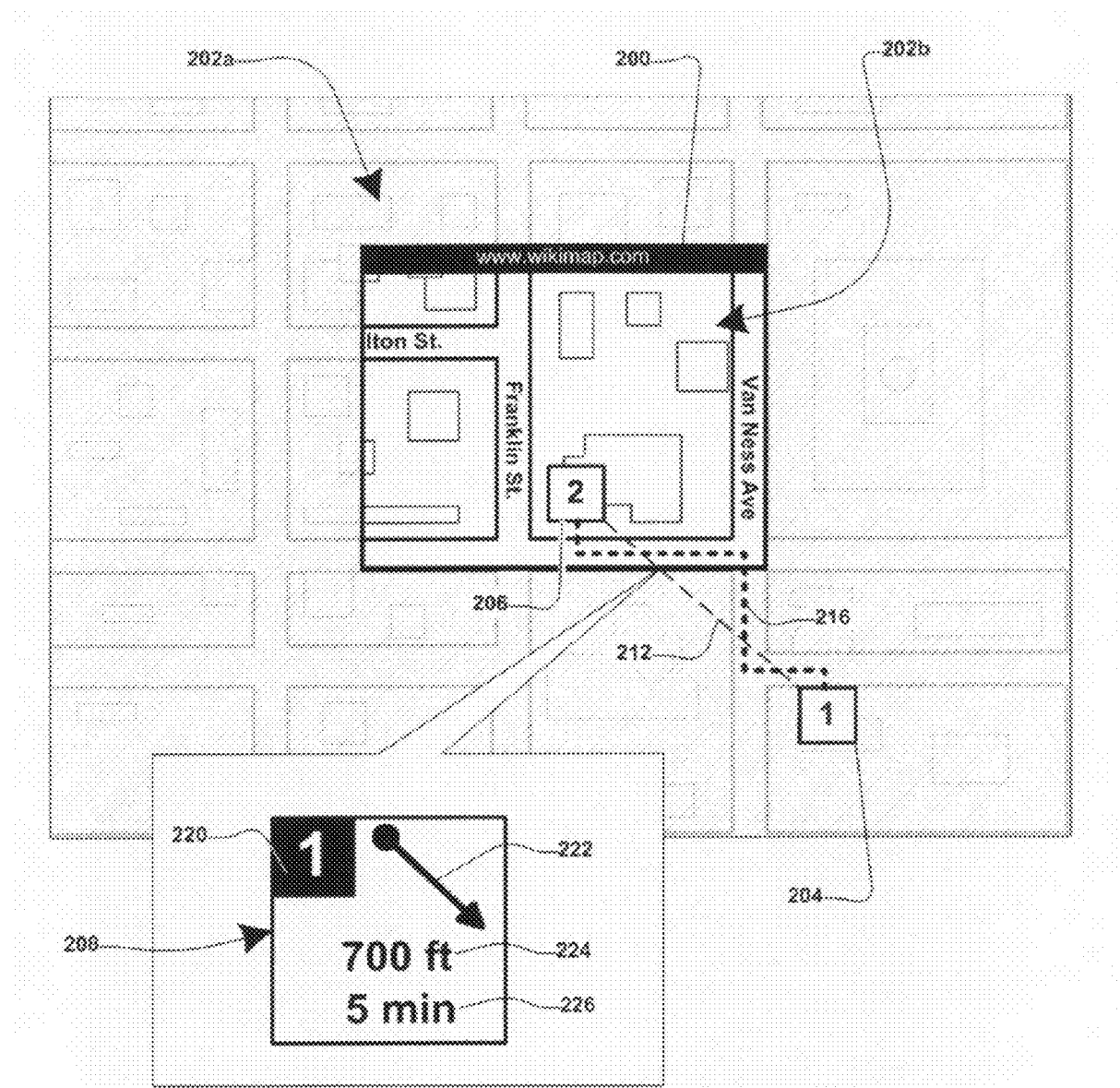

Referring now to FIG. 2C, in the presently-preferred embodiment, the OVI 208 may be displayed on the periphery of the map region 202b. The OVI 208 may be positioned at the intersection of an imaginary line 212—connecting the location markers 204 and 206—and the periphery of the map region 202b. In an alternate preferred embodiment, the OVI 208 may be positioned at the intersection of the imaginary line 212 and the border of the map-display application 200. In these embodiments, the positioning of the OVI 208 may be along a straight line between the visible location marker 206 and the invisible location marker 204. In alternate embodiments, the positioning of the OVI 208 may vary depending on other factors (please see FIG. 3B for alternate embodiments.)

In the presently-preferred embodiment, the OVI 208 may contain information pertaining to the location and distance to the MO (in this example, the location marker 204) that the OVI 208 references. The OVI 208 may contain an alpha-numeric/symbol object reference 220 matching the alpha-numeric/symbol designation of the MO the OVI 208 is referencing. In this example, the alpha-numeric/symbol reference on the OVI 208 is "1", matching the designation "1" on the location marker 204.

In the presently-preferred embodiment, the OVI 208 may contain information pertaining to the travel distance and travel time to the MO (in this example, the location marker 204) that the OVI 208 references. A distance-indicator 224 may display the distance (e.g. "700 ft") between the location marker 206, displayed on the map region 202b, and the location marker 204, referenced by the OVI 208. The distance displayed by the distance-indicator 224 may be computed by an algorithm computing an imaginary travel path 216 between the location marker 206 and the location marker 204.

The algorithm may include considerations such as, one way streets, road conditions, traffic patterns, user preferences, etc, when computing the distance of the optimal route 216. In alternate embodiments, other methods may be used to compute and indicate the distance.

A travel-time indicator 226 may display the time of travel (e.g. "5 min") between the location marker 206, displayed on the map region 202*b*, and the location marker 204, referenced by the OVI 208. The travel-time displayed by the travel-time indicator 226 may be computed by an algorithm computing the time to traverse an imaginary travel path 216 between the location marker 206 and the location marker 204. The algorithm may include considerations such as, one way streets, road conditions, traffic patterns, medium of travel (e.g. on foot, by vehicle, etc.), user preferences, etc, when computing the distance of the optimal route 216. In alternate embodiments, other methods may be used to compute and indicate the travel time.

Please note that the process of determining the travel time and travel distance between two points on a map, is well established and is commonly used in prior art.

Figure 2D:
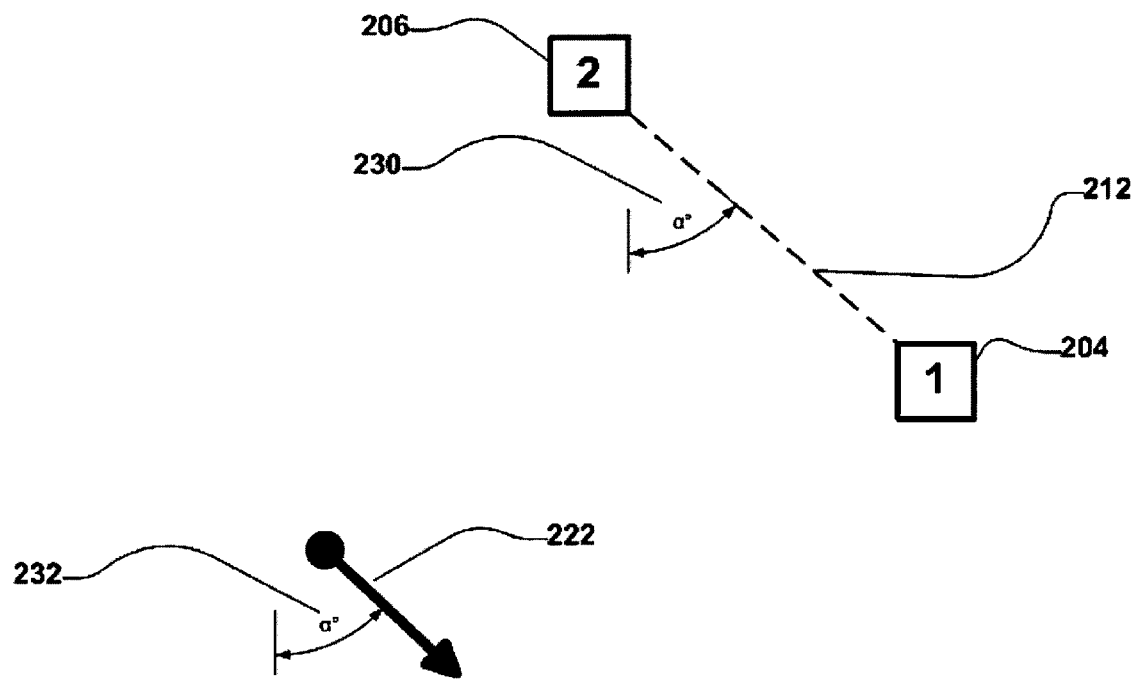

In the presently-preferred embodiment, the OVI 208 may contain information pertaining to direction to the MO (in this example, location marker 204) that the OVI 208 references. In the present embodiment, the vector 222 may point in the direction of the MO that the OVI 208 references. For example, the vector 222 may point in the direction of the location marker 204. Referring additionally to FIG. 2D, an angle α° 230 between the imaginary line 212, connecting the location markers 206 and 204, and the Y axis of the display or any other direction, may be computed. An angle α° 232 between the vector 222, displayed in association with the OVI 208, and the Y axis of the display may be computed to match the angle α° 230. In this manner, the vector 222 may point to the location marker 204. In an alternate embodiment, the angles α° 230 and α° 232 may be computed against the X axis of the display or any other direction.

In alternate embodiments, OVIs may be of different shapes, sizes, colors and may contain other information in addition to the information described in the embodiments above, or different information altogether.

Figure 3A:
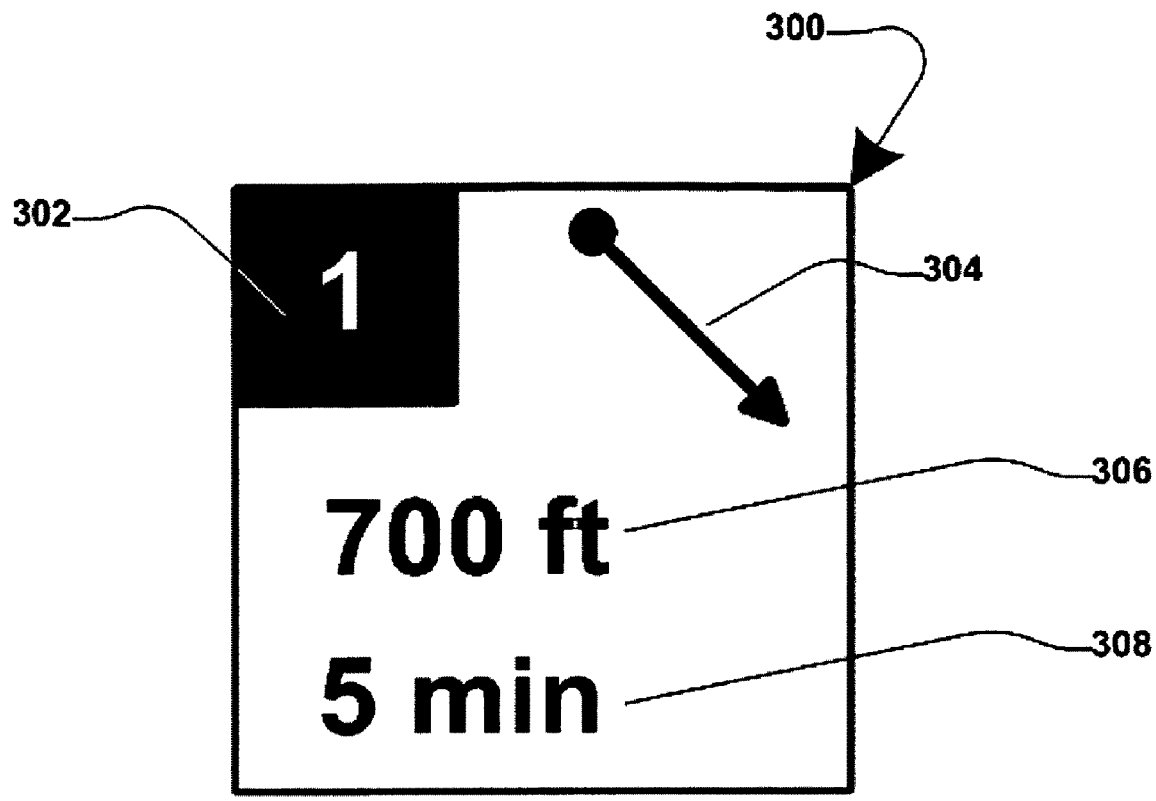
FIGS. 3A, 3B and 3C are a generalized block diagrams illustrating the appearance and positioning of object vector indicators ("OVI"), according to various embodiments of the present invention.
Figure 3B:
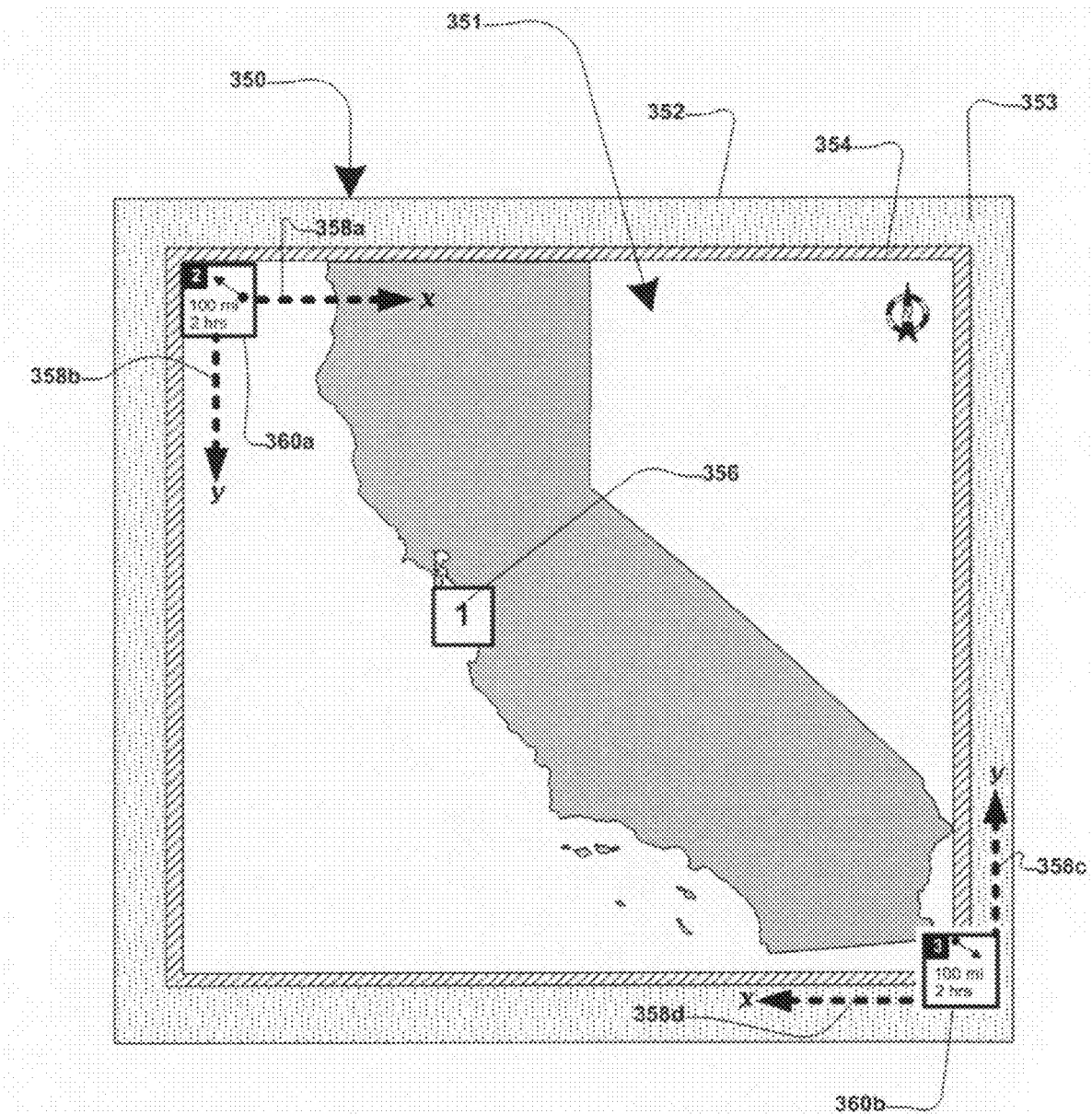
Figure 3C:
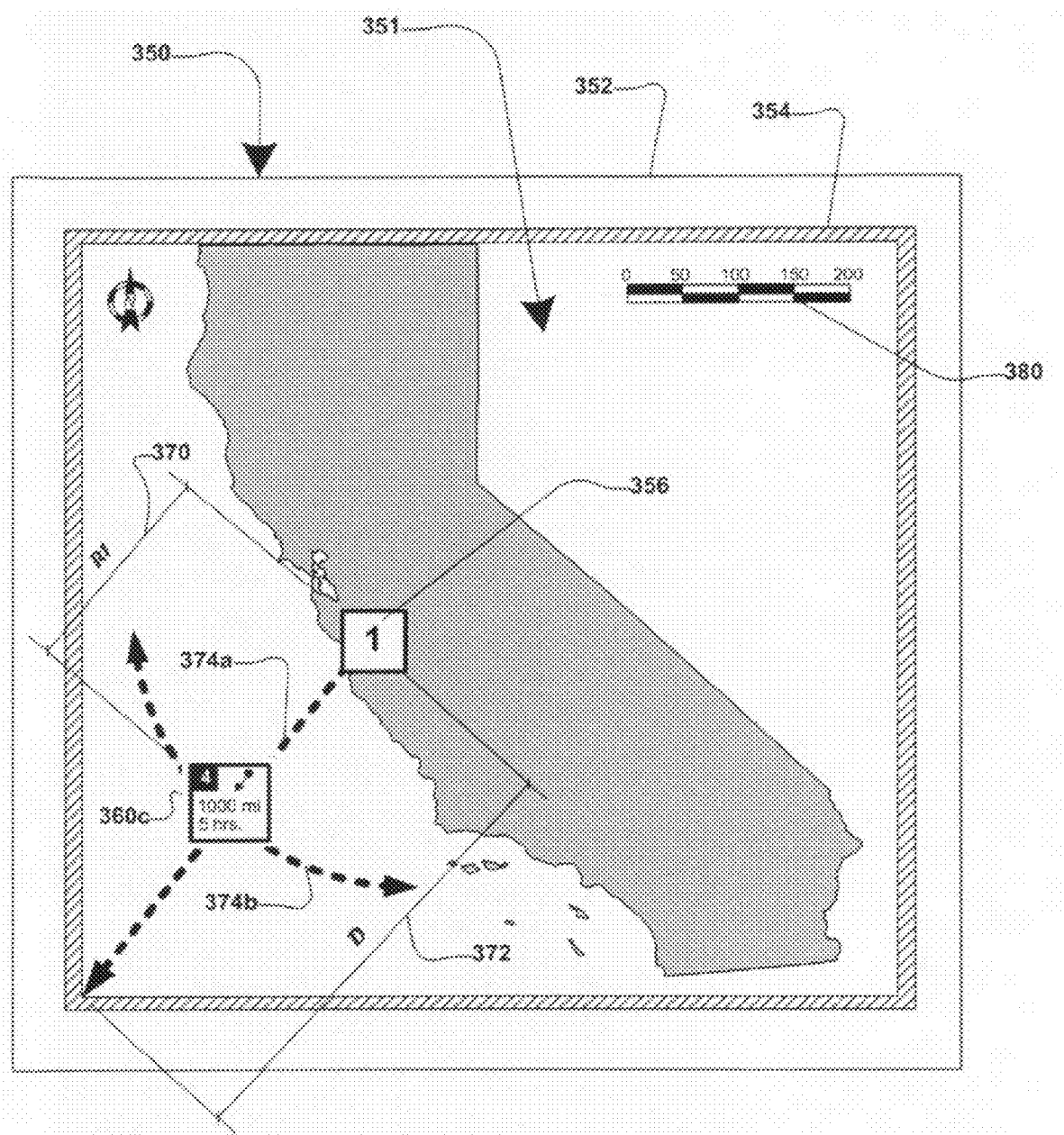

FIGS. 3A, 3B and 3C are a generalized block diagrams illustrating the appearance and positioning of object vector indicators ("OVI"), according to various embodiments of the present invention. An OVI 300 may be rendered in the form of any geometric shape, e.g. a rectangle, and appear in any color, e.g. where the color and/or the color's intensity bears a meaning, such as distance or travel time. Information associated with the OVI 300 (e.g. a vector 304, an object reference 302, a distance indicator 306, a travel-time indicator 308, etc.) may be displayed internally or externally to the OVI 300. In alter embodiments, the OVI 300 may be an image, an animation of images, or any other graphic.

The manner in which the OVI 300 is displayed, its positioning and information it contains, may be set by user preferences or defaults. The position of the OVI 300 may vary and may shift in response to various factors, such as changing road conditions, the movement of the user of the electronic map, etc.

The object reference 302 (e.g. "1") may be an alpha-numeric character and/or a symbol identifying the MO referenced by the OVI 300. In an alternate embodiment, a single OVI may cycles through referencing more than one MO, with the object reference 302 indicating the proper MO throughout the cycle.

The vector 304 may point in the direction of the MO referenced by the OVI 300. The base of the vector 304 may be oriented with an MO visible to the user. The shape of the vector 304 may be a line with an arrowhead at the end. The orientation of the vector 304 may change in response to the motion of the user. For example, as the user travels North with respect to the MO that is due East, the orientation of the vector 304 may change such that it rotates clock-wise and keeps pointing at the MO.

In alternate embodiments, physical characterizes of the vector 304, such as length, thickness, color, etc. may correspond to attributes related to the MO referenced by the OVI 300. For example, traveling in the direction of the MO referenced by the OVI may cause the vector 304 to change shape, color, blink, etc.

The distance indicator 306 may represent the distance needed to travel to reach the referenced MO. The travel distance may be expressed in any unit of measurement, such as English, Metric, etc, and may be based on user preferences, locale settings, distance thresholds (e.g. any distance less than ½ a mile may be expressed in feet), etc. Various methods and algorithms may be used to determine the distance needed to travel (e.g. based on road conditions, method of travel, traffic, etc.) In various embodiments the distance indicator 306 may be in different colors or display modes to indicate various states. For example, for a mobile user traveling along a path between MOs, deviating from an ideal route may cause the color of the distance indicator 306 to change, flash, etc.

The travel-time indicator 308 may represent the time needed to travel to reach the referenced MO. The travel time may be expressed in various ways, for example based on user preferences, locale settings, time thresholds (e.g. travel time less than ½ a hour may be expressed in minutes), etc. Various methods and algorithms may be used to determine the time needed to travel (e.g. based on one way roads, road conditions, method of travel, traffic, speed of travel, etc.) In various embodiments the travel-time indicator 308 may be in different colors or display modes to indicate various states. For example, for a mobile user traveling along a path between MOs, deviating from an ideal route may cause the color of the travel-time indicator 308 to change, flash, etc.

Referring now to FIG. 3B, a map-display application 350 may display a map 351. The map display application 350 may have two borders: the physical border of the display 352 (e.g. the edges of the LCD display beyond which no data can be displayed) and a displayed border 354, confining the map 351. A region 353 between the display-border 354 and the physical border 352, may be used to display additional information. In another embodiment, the display-border 354 may not exist, or may overlap the physical border 352.

A location marker 356 may be displayed on the map 351. Other location markers may exist outside the visible area of the map 351. For example, a location marker "2" (not shown) may exist north-west of the location marker "1" 356 on the map 351, outside the visible area of the map 351. In one possible embodiment, an OVI 360*a* may reference the location marker "2", positioned externally to the visible map 351. The OVI 360*a* may be displayed on the map 351, and may be bound by the display-border 354. According to this one possible embodiment, the OVI 360*a* may be positioned in close proximity to—or touching—the display-border 354.

In this one presently-preferred embodiment, the position of the OVI 360*a* may change along the "x" axis 358*a* and "y" axis 358*b*. For example, when the map 351 is displayed while "in motion" (i.e. the user of the electronic device displaying the map 351 is moving and/or the referenced location marker "2" is in motion) the OVI 360*a* may be repositioned along the "x" axis 358*a*, in response to a relative East-West movement;

and along the "y" axis 358*b* in response to a relative North-South movement—within the confines of display-border 354.

In an alternate preferred embodiment, an OVI 360*b* may be displayed on top of the display-border 354 (e.g. the display-border 354 may bisect the OVI 360*b*.). A portion of the OVI 360*b* may be displayed on top of the map 351, another portion may be displayed on top of the display-border 354 and another portion may be displayed over the region 353. In response to a relative change in the position of the referenced MO (e.g. a location marker "3"—not shown—referenced by the OVI 360*b*) the OVI 360*b* may move East-West, along the "x" axis 358*d*, and/or North-South, along the "y" axis 358*c*.

Referring now to FIG. 3C, in another alternate embodiment, an OVI 360*c* (e.g. referencing a MO "4"—not shown—external to the map 351, South-West of the location marker 356) may be displayed on the map 351. The OVI 360*c* may be positioned along an imaginary line 374*a*, spanned between the location marker "1" 356 and the MO "4" (not shown).

In one possible embodiment, the positioning of the OVI 360*c* along the length "D" 372 of the imaginary line 374*a* may be proportionate to the real-life distance between the geographic location denoted by the location marker "1" 356 and the MO denoted by the location marker "4" (not shown.), on a different scale from the scale of the map 351. The length "D" of the imaginary line 374*a* may be defined as the distance between the location marker "1" 356 and the intersection point of the imaginary line 374*a* with the display-frame 354.

For example, the map 351 may be displayed on a scale where 1 inch=100 miles (as indicated by a scale 380.) The distance from the location marker "1" 356 to the referenced MO "4" may be 1,000 miles in this example (as indicated by the distance measurement in the OVI 360*c*.) The distance "D" 372—being the length of the imaginary line 374*a*—may represent a larger scale, for example, 1 inch=600 miles. Thus the distance "D" 372 of the imaginary line 374*a* may represent about 2,000 miles (approximately 3 inches on the map 351.) In this example, the positioning of the OVI 360*c* approximately at the half-way point of the imaginary line 374*a*, may serve as a visual indicator to the user that the invisible referenced MO "4" may be approximately 1,000 miles away. The repositioning of the OVI 360*c* along the imaginary line 374*a*, North-West in the direction of the location marker "1" 356, may serve as a visual indicator to the user that the invisible referenced MO "4" is getting closer to the location marker "1" 356 and thereby closer to the user and closer to being visible on the map 351.

An imaginary arched path 374*b*, at a radius "R1" 370 from the location marker "1" 356, may be followed by the OVI 360*c* as the invisible referenced MO "4" moves around the location marker "1" 356. For example, if the user standing at a geographic location represented by the location marker "1" 356 makes a complete 360 degree turn clockwise, the OVI 360*c* may sweep along the arc 374*b* in a counter-clockwise direction, maintaining the radius "R1" 370 as the distance. R1 may increase or decrease in relation to the change in the distance between the location marker "1" 356 and the invisible referenced MO "4", as discussed in the previous paragraph.

In alternate embodiments, various other methods and visual representations may be used to reference MOs external to the map 351, without departing from the scope and spirit of the present invention.

Figure 4A:
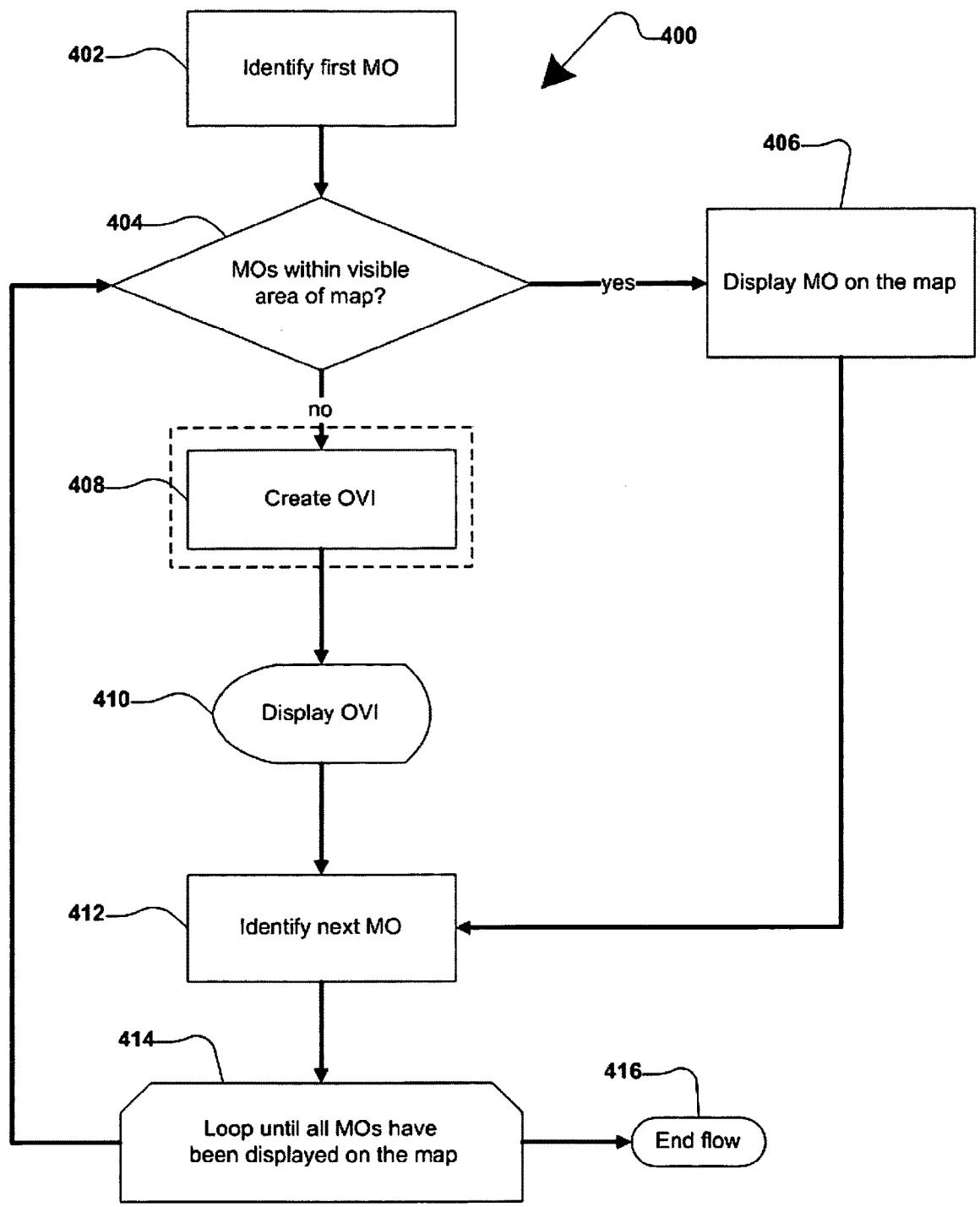
FIGS. 4A and 4B are generalized flow diagrams illustrating the creation and displaying of OVIs, according to various embodiments of the present invention.
Figure 4B:
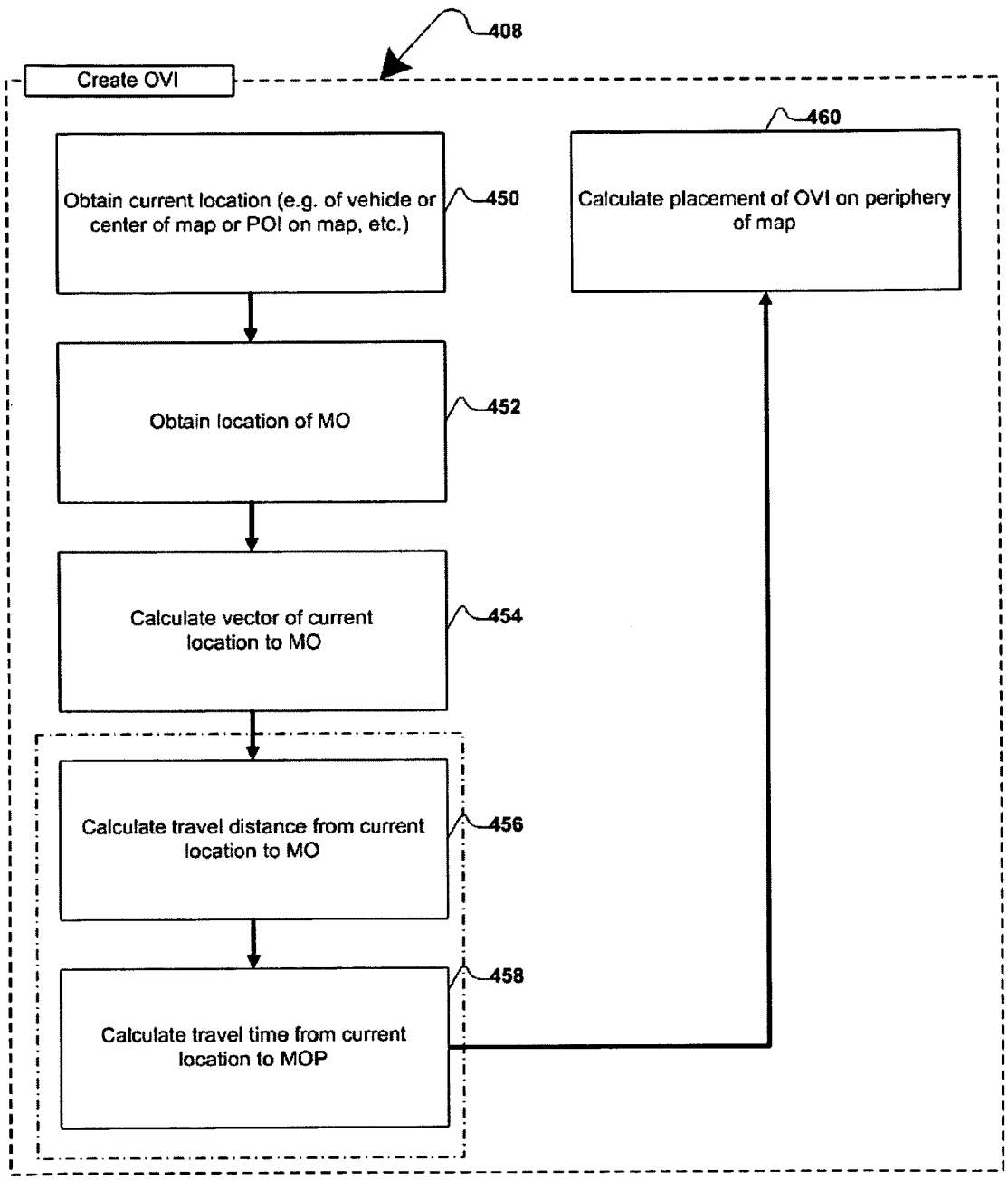

FIGS. 4A and 4B are generalized flow diagrams illustrating the creation and displaying of OVIs, according to various embodiments of the present invention. A map-display application, running on a digital device and connected to a mapping server (e.g. an internet browser on a personal computer/laptop/tablet PC, etc., connected to a mapping service such as Google® Maps, Yahoo!® Maps, Windows® Live Search Maps etc.; a GPS navigation unit such as Garmin®, Magellan®, TomTom® etc. connected to a local mapping server/database (e.g. a mapping DVD) or to a remote mapping server and displaying a map through a proprietary map-display application; a cellular/smart phone displaying mapping data through an internet browsing application or a mapping application, etc.)

Flowchart 400 illustrates a methodology for displaying OVIs by a map-display application. Upon a triggered event in the map-display application (e.g. a change in zoom/pan, change in data causing a "redraw" or "refresh" command to execute by the map-display application, in response to user input, programmable "event", etc.) In the flow 400 all MOs to be displayed on a map (e.g. the resulting list of locations from a user search, waypoints displayed as part of mapping directions, etc.) may be traversed and every MO may either be displayed as a location maker—if on the area of the map visible to the user—or as an OVI—if not on the area of the map visible to the user.

At step 402, the first way-point ("WP") or point-of-interest ("POI") collectively referred to inhere as map-object ("MO") may be identified. The first MO might be the first of any number of MOs demarcated on a map via location markers—such as locations resulting from a search.

At step 404, it may be determined whether the MO is within the visible area of a map. The determination may be made by calculating the geographic bounds of the region of the map displayed by the map-display application, and determining whether the geographic (e.g. longitude/latitude) coordinates of the MO are within the bounds of the visible area of the map (please note that this type of determination is well established in prior art, as map-display applications determine what geographic locations are to be displayed.)

If it is determined at step 404 that the MO is within the bounds of the visible area of the map, at step 406 the MO may be displayed on the visible area of the map of the map-display application. At step 412, the next MO is identified and at step 414 the process is repeated until all MOs have been displayed on the map. Steps 404, 406, 412 and 414 may be repeated until all MOs have been traversed.

If it is determined at step 404 that the MO is not within the bounds of the visible area of the map, at step 408 an OVI may be created to reference the MO. (Please refer to FIG. 4B illustrating the creation of an OVI.)

At step 410, the OVI created at step 408 may be displayed. The OVI may be displayed in numerous ways. Please refer to the discussion of FIGS. 3A-3C for OVI display embodiments.

At step 412, the next MO may be identified. Step 412 may also be executed following step 406.

If at step 412 another valid MO is identified, step 414 may revert to step 404, examining the new MO identified at step 412. If at step 414 it is determined no valid MO has been identified at step 412 (i.e. all MOs have been traversed) at step 416 the logic of the flow 400 may end.

Please note that in embodiment, steps 404, 406, 412 and 414 may be implemented, while in other embodiments the additional steps 408 and 410 may be implemented.

Referring now to FIG. 4B, steps 450-460 may be steps comprising the "create OVI" step 408 in FIG. 4A.

At step 450, the current location of the electronic device displaying the map-displayed application, may be obtained (e.g. via the use of GPS navigation, cellular phone triangulation, etc.) In an alternate embodiment, the geographic location of a MO on the map (e.g. the MO at the center of the map) may be considered to be the current location.

At step 452, the location of the MO (identified at step 412 and determined to not be within the visible area of the map of the map-display application at step 404 of FIG. 4A), may be determined.

At step 454, a vector from the current location determined at step 450 to the location of the MO determined at step 452, may be computed. The vector (e.g. an arrow) may represent the direction and distance between the current location and the location of the MO.

At step 456, the travel distance between the current location determined at step 450 and the location of the MO determined at step 452, may be computed. The algorithm for computing the travel distance may be based on the medium of travel (i.e. by foot, car, etc.), the optimal choosing of roads, user preferences, etc.

At step 458, the travel time between the current location determined at step 450 and the location of the MO determined at step 452, may be computed. The algorithm for computing the travel time may be based on the medium of travel, the optimal choosing of roads, user preferences, traffic and weather conditions, etc.

At step 460, the placement of the OVI on the map-display application may be determined. Please refer to FIGS. 3A-3C for a more complete discussion of various embodiments for placing an OVI in a map-display application.

Figure 5A:
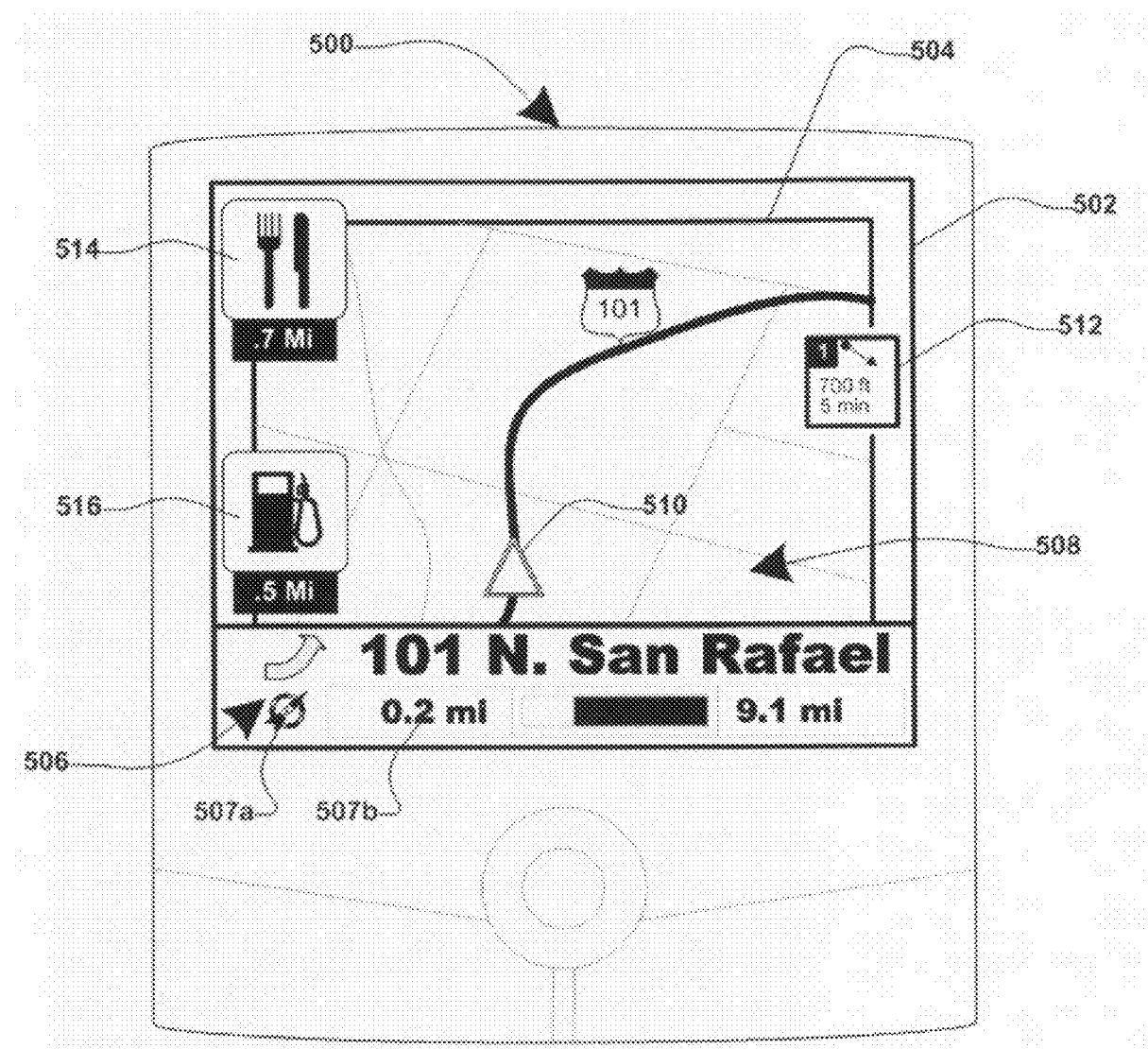
FIGS. 5A and 5B are generalized block diagrams illustrating displaying object vector indicators ("OVI") in GPS navigation devices, according to one embodiment of the present invention.
Figure 5B:
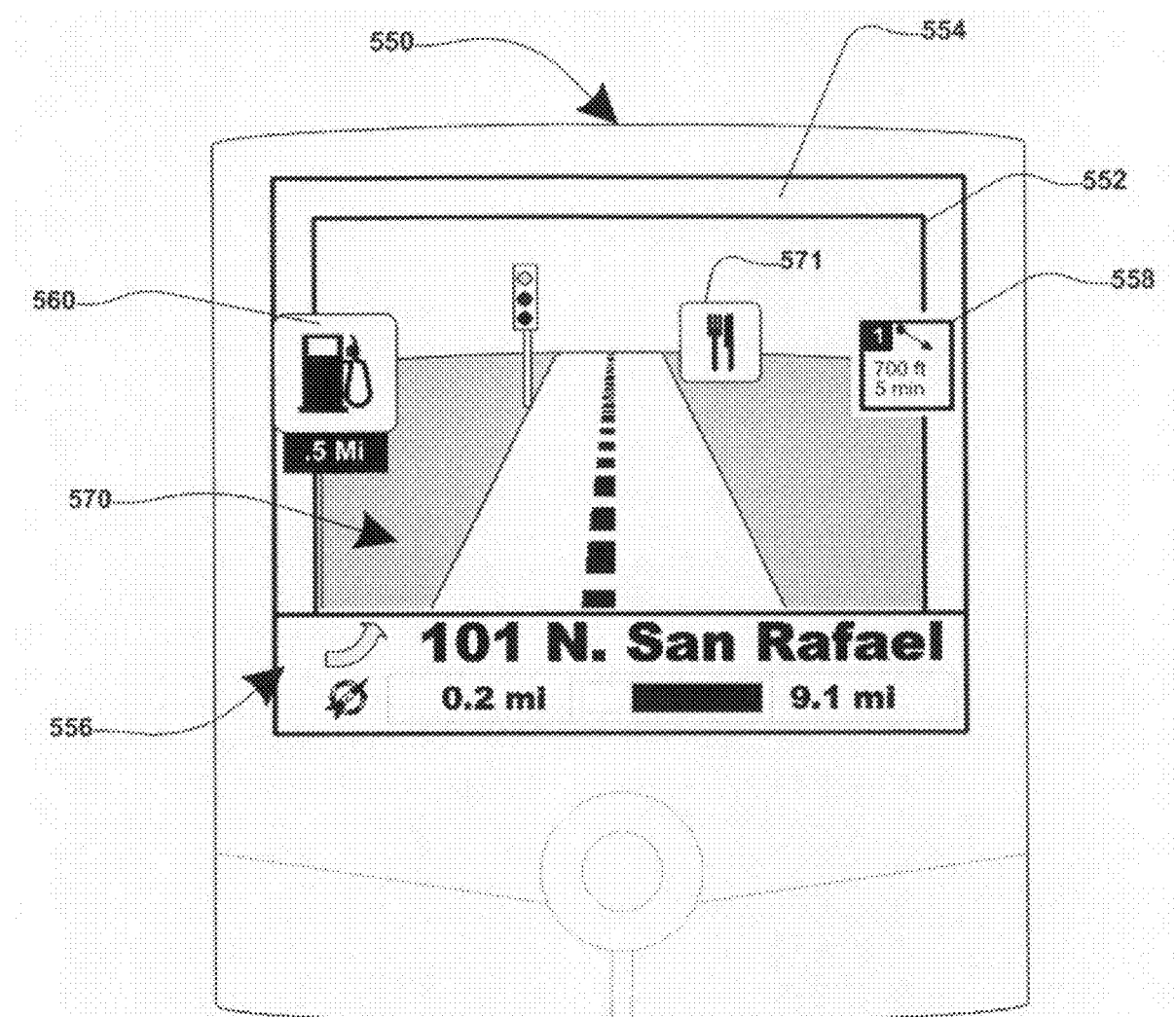

FIGS. 5A and 5B are generalized block diagrams illustrating displaying object vector indicators ("OVI") in GPS navigation devices, according to one embodiment of the present invention. GPS navigation devices (e.g. used in car navigation) may display way-points ("WP") or points-of-interest ("POI") collectively referred to inhere as map-objects ("MO").

In the prior art, only MOs within the bounds of a visible portion of a map are displayed. MOs outside the bounds of the visible portion of the map are not displayed. A MO that is the next way-point or destination in travel directions, may be referenced. For example, referring to FIG. 5A, a GPS navigation device 500 may display a visible area of a map 508 in a map-display application 506. A direction-indicator 507A and a distance indicator 507b may reference the next MO along a travel route. However, no other MOs are referenced, in the prior art.

In one preferred embodiment of this invention, OVIs 512, 514 and 516 may be displayed by the map-display application 506, referencing MOs which are outside the area of the map 508 visible to the user through the map-display application 506. The OVI 512 may display information referencing a MO "1" outside the visible area of the map 508. The OVI 512 may indicate the direction of the MO it references (e.g. via an arrow), the distance to the MO (e.g. "700 ft") and the travel time to the MO (e.g. "5 min.")

In an alternate preferred embodiment, an OVI may display a symbol indicating the nature of the MO it references, along with other relevant information, such as the distance, etc. For example, the OVI 514 may include a prominent symbol related to eating—such as a knife and fork—commonly used in road signs to indicate a restaurant. The OVI 516 may display a prominent symbol of a gas station, indicating a refueling station.

The distance indicators in the OVIs 512, 514 and 516 may be measured from the current location of the vehicle/user, commonly indicated by a symbol 510 on the map 508. In response to a change in the location of the vehicle/user, the positioning of the OVIs 512, 514 and 516, and information the OVIs contain (e.g. distance), may change. The OVIs 512, 514 and 516 may be displayed on the periphery of the map-display application 506. In one embodiment, the map-display application 506 may contain a physical border 502 (i.e. the physical edge of the display) and a display-border 504 (i.e. the edges of the visible area of the map 508.) The OVIs 512, 514 and 516 may be displayed overlaying the display-border 504 (i.e. extending farther towards the physical border 502 than the visible area of the map 508, which may be confined to within the border 504.) In alternate embodiments, the OVIs may be displayed in various other ways, as illustrated and discussed in FIGS. 3A-3C.

Referring now to FIG. 5B, a GPS navigation device 550 may display a graphic 570, which may correlate to a physical map, from the perspective of a driver. In prior art, a MO 571 (e.g. a location marker with a symbol for a restaurant) may be displayed by the graphic 570, representing the approximate location of the MO, from the perspective of the viewer (i.e. the driver.) The MO 570 must be within the field-of-view of the user (i.e. driver) albeit at a certain distance (i.e. down-the-road.)

In the present embodiment, OVIs 558 and 560 may be displayed by a map-display application 556, to indicate MOs not visible on the graphic 570 (i.e. outside the field-of-view of the user/driver.). The placement of OVIs may be computed such that, from the perspective of the user/viewer/driver, the top of the display frame 552 may be considered "in front"; the left and right sides of the display frame 552 may be considered "left of" and "right of", respectively; and the bottom of the display frame 552 may be considered "behind".

As a vehicle that mat be associated with the GPS navigation device 550, in this example, moves and its own position is recomputed, the OVIs 558 and 560 may be repositioned accordingly. In this example, the OVI "1" 558, positioned along the right side of the display border 552, may indicate its referenced MO is to the right of the vehicle (i.e. of the GPS navigation device 550), outside the user/viewer/driver's field-of-view. Information associated with the OVI 558 (e.g. direction, distance, time-of-arrival, etc.) may be displayed inside of—or in close proximity to—the OVI 558. Similarly, the OVI "2" 560, positioned left-of-center along the top of the display border 552, may indicate the MO (e.g. gas station) the OVI "2" 560 references is to-the-left of the vehicle (i.e. of the GPS navigation device 550).

In alternate embodiments other methods of displaying OVIs in GPS navigation units may be employed. OVIs may bear different shapes, colors, move in different directions, contain various different information, etc.

Figure 6A:
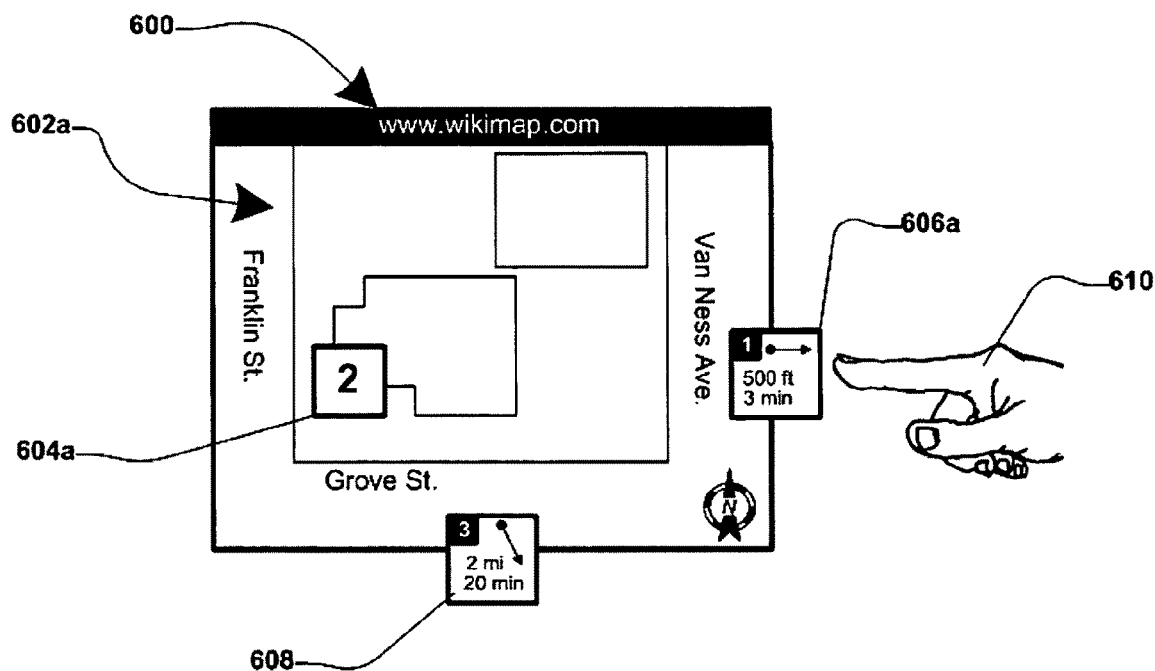
FIGS. 6A and 6B are generalized block diagrams illustrating displaying and utilizing OVIs to move around a map (i.e. pan a map), according to one embodiment of the present invention.
Figure 6B:
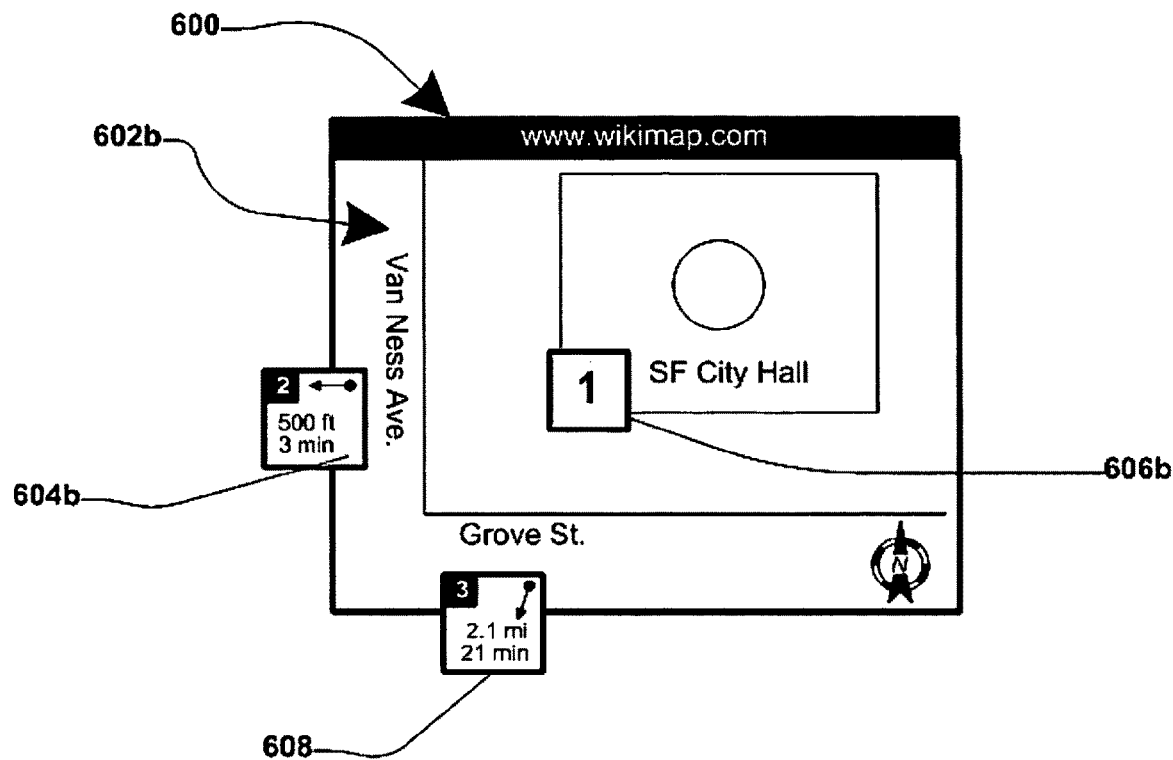

FIGS. 6A and 6B are generalized block diagrams illustrating displaying and utilizing OVIs to move around a map (i.e. pan a map), according to one embodiment of the present invention. Electronic devices, displaying digital maps, commonly allow a user to interface with the map via inputs (e.g. a touch screen, a computer mouse, a keyboard, buttons, voice interface, etc.)

In the presently-preferred embodiment, a MO (e.g. a location marker) which is visible to the user on a region of a map, may alter its form to an OVI, referencing the MO, in response to a shift (e.g. a pan) of the region of the map, such that the MO is no longer visible on the region of the map. For example, a location marker may be displayed on a region of a map. The region of the map may shift right, in response to a user's panning the map to the left. The location marker may shift right with the rest of the region of the map, maintaining its geographic position. Once the region of the map has shifted right sufficiently for the location marker to become invisible to the user, the location marker may be replaced with an OVI, referencing the theoretical position of the location marker (now invisible to the user.)

Referring to FIG. 6A, a map-display application 600, running on an electronic device (e.g. a computer, personal digital assistant, cellular phone, GPS navigation unit, etc.) may display a map region 602a. The map region 602a may include one or more location markers, such as a location marker "2" 604a. The map-display application may display one or more OVIs, referencing map objects ("MO") that are not visible to the user of the map-display application 600.

In this example, an OVI 608, displayed South/South-East of the location marker "2" 604a, on the periphery of the map region 602a, may contain the information "3, 2 ml, 20 min", referencing a location marker labeled "3" which is 2 miles and a 20 minute travel time, due South/South-East of the location marker "2" 604a. Similarly, an OVI 606a, displayed East of the location marker "2" 604a, on the periphery of the map region 602a, may contain the information "1, 500 ft, 3 min", referencing a location marker labeled "1" which is 500 feet and a 3-minute travel time, due East of the location marker "2" 604a.

In the presently-preferred embodiment, the user may use an input device (e.g. the illustrated "hand/finger" 610, a stylus, a button, a keyboard, a mouse, voice instructions, etc) to select an OVI. Selecting an OVI may cause the map region displayed in the map-display application 600 to pan such that the selected OVI is visible in the new map region displayed. In another preferred embodiment, the new map region may be displayed (i.e. panned to) such that the geographic location indicated by the OVI selected is centered in the new map region displayed. In alternate embodiments, selecting an OVI may pan and zoom a map such that the visible map region includes both the originally-centered location marker and the newly-selected location marker, referenced by the selected OVI.

In this example, selecting the OVI "1" 606a may cause the map region 602a and the OVIs 606a and 608, displayed by the map-display application 600, to change. Referring now to FIG. 6B, in response to the user's selecting (e.g. by clicking on) the OVI "1" 606a, the original map region 602a, displayed by the map-display application 600, may be panned to form a map region 602b. The map region 602b may be centered around the location marker "1" 606b. The location marker "1" 606b may have taken the form of the OVI "1" 606a while outside of the map region 602a.

Accordingly, the location marker "2" 604a. (see FIG. 6A), not visible on the map region 602b, may be referenced by a new OVI "2" 604b, indicating the invisible location marker "2" is 500 ft and a 3-minute-travel time due West from the visible location marker "1" 606b.

When the location maker "1" 606b becomes at the center of the map region 602b, the position OVI "3" 608 and information it contains, may change. In FIG. 6A, while the location marker "2" 604a was at the center of the map region 602a, the OVI "3" 608 displayed a distance of 2 miles, a travel time of 20 minutes and a direction vector of South/South-East. Referring back to FIG. 6B, with the geographic shift (from the map region 602a to the map region 602b) of 500 feet due West from the location marker "2" 604a, to the location marker "1" 606b being at the center of the new map region 602b, the information displayed by the OVI "3" 608 may be change. The OVI "3" 608 may now display a new distance of 2.1 miles, a new travel-time of 21 minutes and a direction vector of South/South-West.

Please note that in this example, the travel-time differences are illustrated as being dependent strictly on vector geometry, whereas in a real implementation of the presently-preferred embodiment of this invention, travel time may vary and be calibrated according to road conditions, traffic patterns, etc.

The panning of a map to display a location marker at the map's center, referenced by a selected OVI, may be accomplished in various ways in different embodiments. In one possible embodiment, the map may instantaneously change from displaying the "original map", with the original location marker at its center, to displaying the "new map", with the location marker referenced by the OVI selected, at the center of the new map. In alternate embodiments, the transition of the map regions displayed may be slowed down and/or animated (please see further discussion of these embodiments in FIGS. 8A-8C and 9A-9C.)

Figure 7:
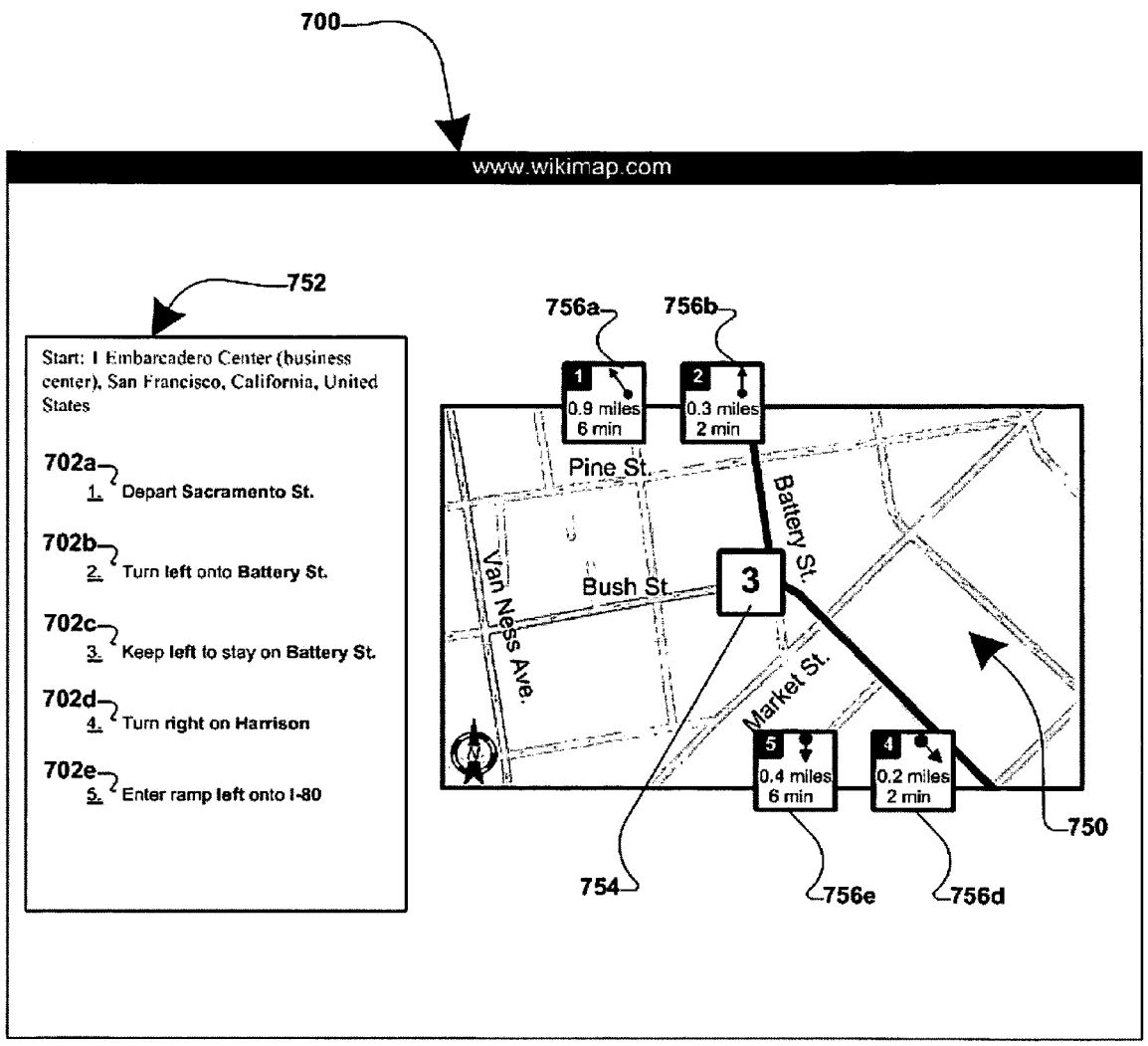
FIG. 7 is a generalized block diagram illustrating displaying object vector indicators ("OVI") on a directions map, according to one embodiment of the present invention.

FIG. 7 is a generalized block diagram illustrating displaying object vector indicators ("OVI") on a directions map, according to one embodiment of the present invention. A map display application 700 (e.g. an internet browser), on a computing device (e.g. a personal computer, a personal digital assistant, a cellular phone, etc.) may display a visible area of a map 750. The visible area of a map 750 may represent a portion of a larger virtual map—while the larger virtual map (e.g. the entire globe) may remain invisible to the user, its portion comprising the visible area of a map 750, may be visible to the user. The visible area of the map 750 may include one or more MOs visible to the user. The map-display application 700 may also include references to MOs outside a visible area of a map 750.

In prior art, a user may request, from a mapping service, travel directions between two points. In response to the user request, the map-display application 700 may display a list of travel directions 752. The list 752 may include way-points 702a, 702b, 702c, 702d and 702e. The visible area of the map 750 may not include all the way-points. For example, the zoom-level may be such that only one way-point "3" 702c may be included in the visible area of the map 750. The included way-point "3" 702c may be displayed as MO "3" 754. In prior art, way-points not included in the visible area of the map 750 may not be graphically indicated to the user in conjunction with the visible area of the map 750.

In the presently-preferred embodiment, the way-points 702a, 702b, 702d and 702e, whose geographic location may be outside the visible area of the map 750, may be referenced by OVIs 756a, 756b, 756d and 756e, respectively. The OVI "1" 756a, positioned approximately North/North-West of the MO "3" 754, may contain the information "0.9 miles 6 min". This may indicate to the user that an imaginary MO "1", corresponding to the way-point "1" 702a "depart Sacramento St.", is 0.9 miles and 6 minutes away from the way-point "3" 702c "keep left and stay on Battery St." displayed as the MO "3" 754 in the visible area of the map 750.

Similarly, the OVI "2" 756b, positioned approximately North of the MO "3" 754, may contain the information "0.3 miles 2 min". This may indicate to the user that an imaginary MO "2", corresponding to the way-point "2" 702b "Turn left onto Battery St.", is 0.3 miles and 2 minutes away from the way-point "3" 702c "keep left and stay on Battery St." displayed as the MO "3" 754 in the visible area of the map 750. Similarly, the OVIs 756d and 756e may represent the direction and distance to the imaginary MOs on the map outside of the visible area of the map 750, corresponding to the geographic locations of the way-points 702d and 702e, respectively.

In response to a panning or zooming of the visible area of the map 750, the way-points 702a, 702b, 702d and 702e, whose geographic location may now be within the bounds of the visible area of the map 750, may be displayed as MOs. The way-points 702a, 702b, 702d and 702e, whose geographic location may remain outside the bounds of the visible area of the map 750, may be displayed as OVIs, referencing the imaginary locations of the MOs corresponding to the way-points whose geographic location may not be within the bounds of the visible area of the map 750.

In prior art, selecting a way-point from the list 752 may cause the visible area of the map 750 to change such that the way-point selected is displayed as a MO at the center of the new visible area of the map. In another preferred embodiment of the present invention, the selection of an OVI may cause the same effect as the selection of the way-point corresponding to the OVI, in prior art—i.e. the visible area of the map 750 may change such that the MO corresponding to the selected OVI, is at the center of the new visible area of the map 750. Other MOs which may no longer be within the bounds of the new visible area of the map 750, may be referenced by new OVIs. Conversely, way-points previously outside the bounds of the visible area of the map 750 and previously represented by OVIs, which may now be within the bounds of the new visible area of the map 750, may now be represented by new MOs.

Figure 8A:
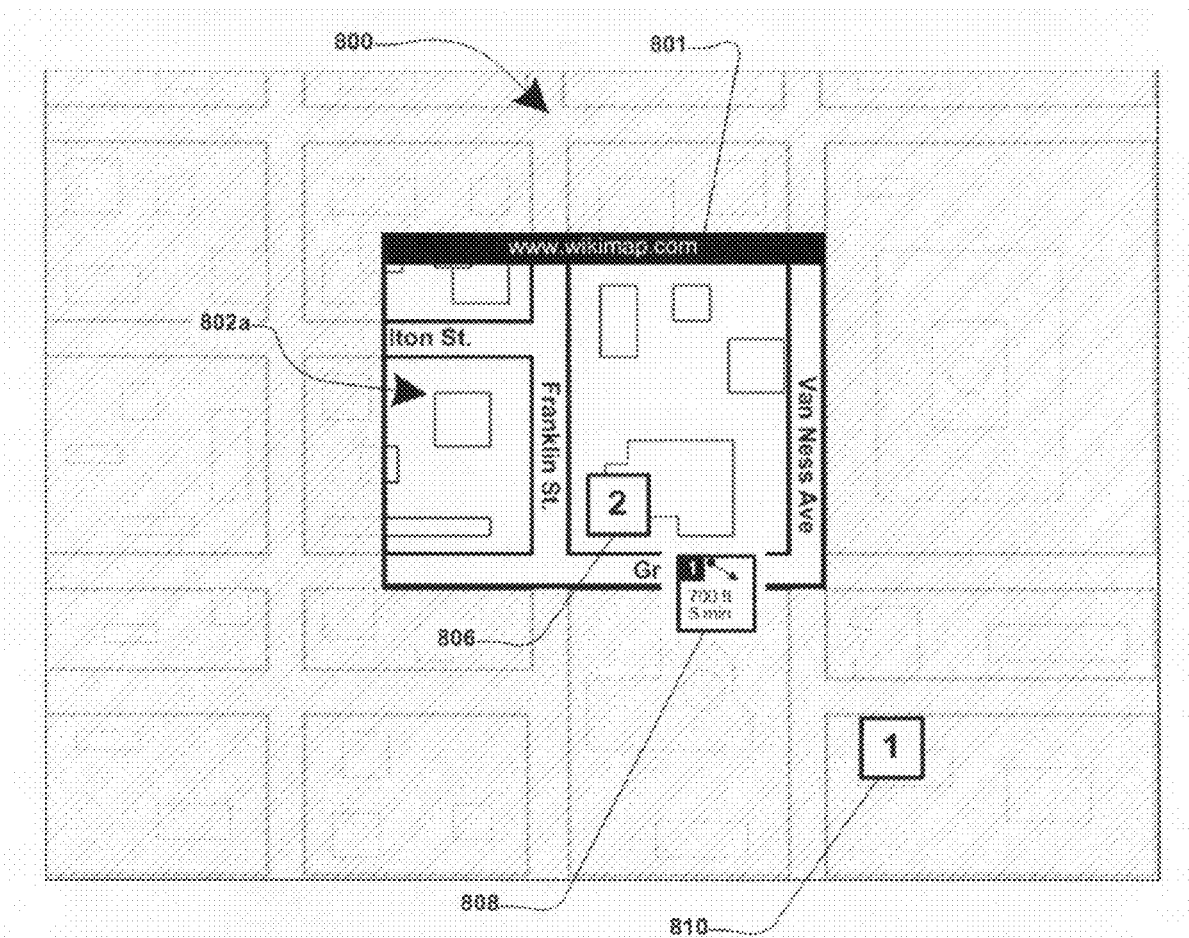
FIGS. 8A, 8B and 8C are generalized block diagrams illustrating displaying object vector indicators ("OVI") and utilizing OVIs to pan around a map in an automated fashion, according various embodiments of the present invention.
Figure 8B:
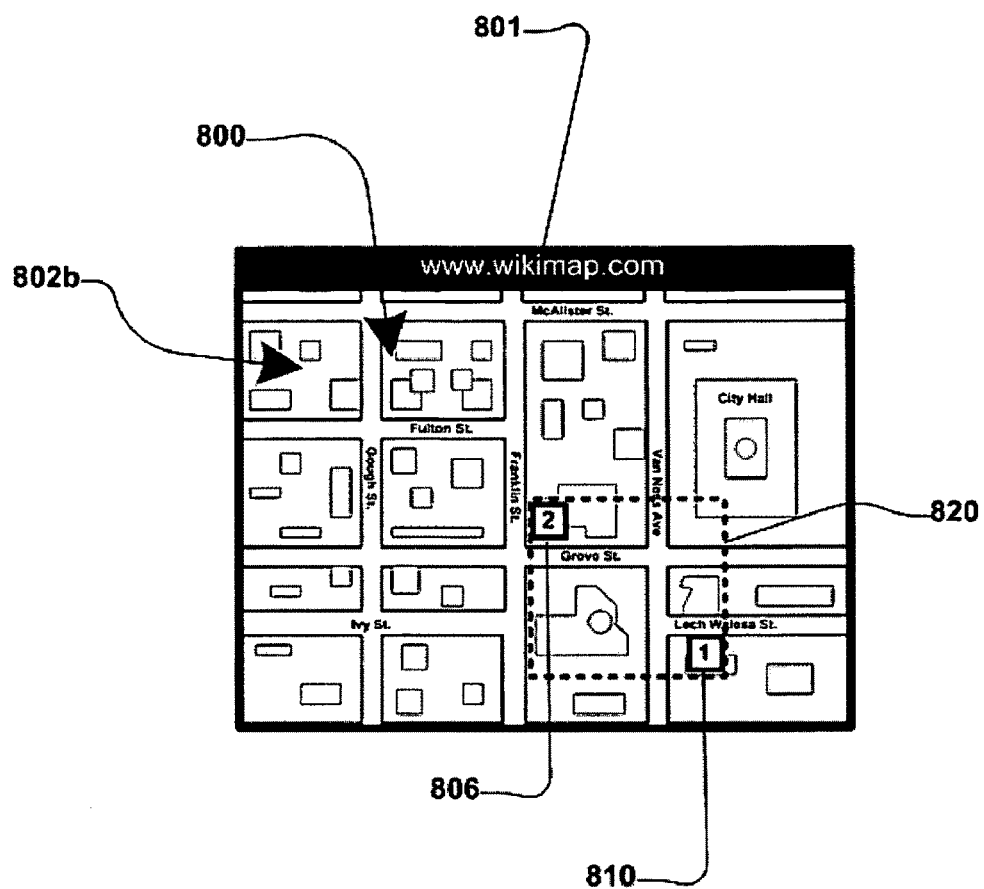
Figure 8C:
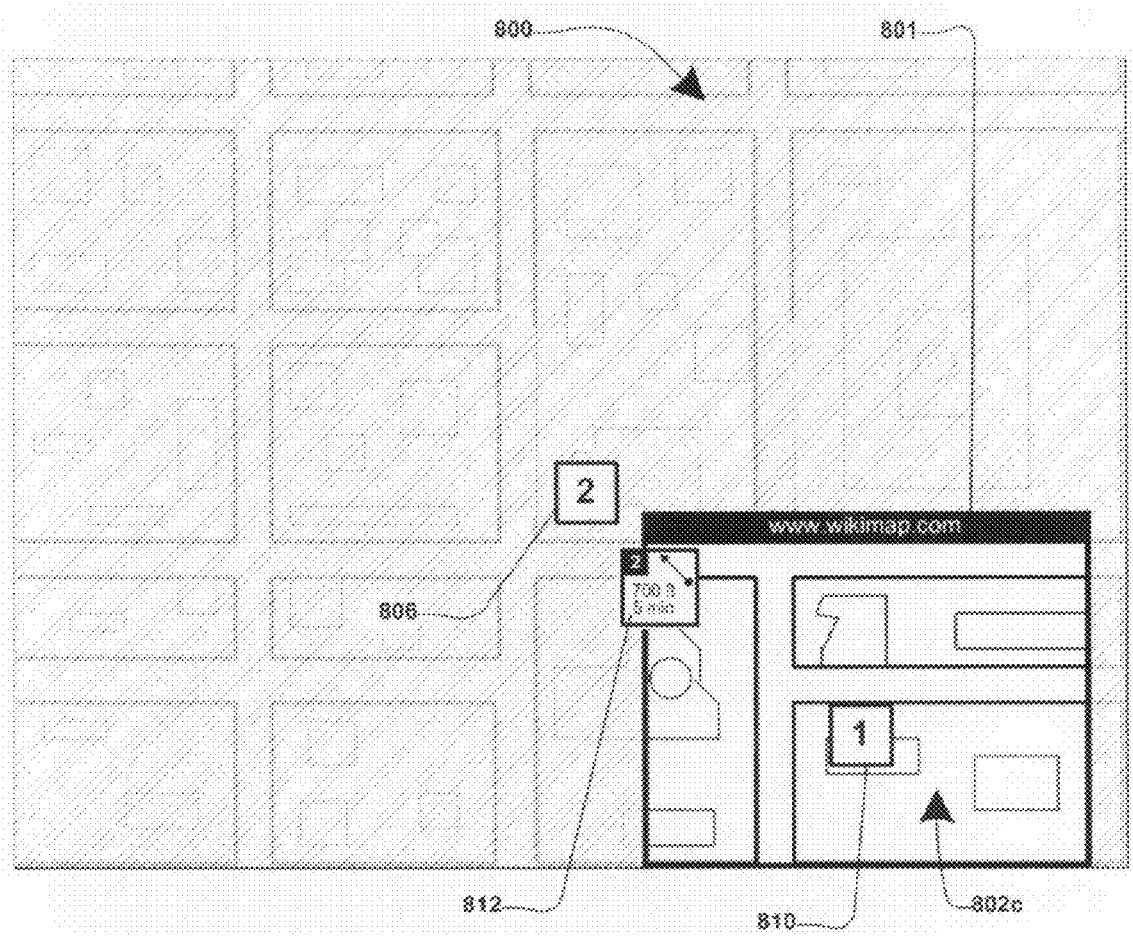

FIGS. 8A, 8B and 8C are generalized block diagrams illustrating displaying object vector indicators ("OVI") and utilizing OVIs to pan around a map in an automated fashion, according to various embodiments of the present invention. In response to a user's selection of an OVI, a map-display application may zoom and/or pan the map, transitioning the view from displaying an area including one location marker, to displaying an area including another location marker, referenced by the selected OVI.

Referring to FIG. 8A, a map-display application 801 may display a map-region 802a of a map 800. The map 800 may be invisible to the user, except the area comprising the map-region 802a (the cross-hatching in FIGS. 8A-8C signifies portions of the map 800 not visible to the user.) The dimensions of the map-region 802a may be determined by the zoom level of the map-display application 801, the dimensions of the map-display application 801 etc. The map-region 802a may be the only portion of the map 800 visible to the user, through the map-display application 801. Other portions of the map 800, outside of the map-region 802a, may not be visible to the user. A location marker 810 located on a portion of the map 800 outside of the map-region 802a, may not be visible to the user.

A location marker "2" 806 may be displayed on the map-region 802a, for example, to denote a way-point or landmark in the geographic location corresponding to the location of the location marker 806. One or more remote location markers on the map 800 may not be visible to the user of the map-display application 801. For example, the location marker "1" 810 may not be visible to the user.

OVIs may be displayed in the map-display application 801, indicating to the user the direction—as well as other relevant information, such as distance, travel time, etc.—of the location markers not visible (e.g. the location marker "1" 810.)

In prior art, the user viewing the map-region 802a in the map-display application 801, may not know the direction and distance to the invisible location marker "1" 810. In order to bring the location marker "1" 810 into view in the map-display application 801, the user has to (1) pan the map 800 in the general direction of the location marker 810 until the visible portion of the map 800 includes the location marker 810, and/or (2) zoom out until the visible portion of the map 800 includes the location marker 810, and/or (3) in the case of menu referencing the location marker 810, selecting the reference to the location marker 810 from the menu causing the portion of the map 800 including the location marker 810 to become visible in the map-display application 801.

In the presently-preferred embodiment, the user may select an OVI and in response, the map-display application may perform a series of autonomous steps. The user may select the OVI "1" 808 (e.g. by clicking on it with a pointing device, by touching it through a touch screen, via a voice instruction, etc.) In response, referring now to FIG. 8B, the map-display application 801 may zoom-out and/or pan the map 800, such that the map-region 802b (i.e. the portion of the map 800 displayed through map-display application 801) may include both the location marker "2" 806 and the location marker "1" 810. In an alternate embodiment, the map 800 may be zoomed and/or panned in such manner that the map-display application 801 may display a minimal map-region 820 of the map 800, with the location markers 806 and 810 at its borders (the minimal map-region 820 may be defined as the smallest area of the map 800 inclusive of all location markers, i.e. 806 and 810.)

Referring now to FIG. 8C, the map-display application 801 may display a map-region 802c of the map 800. The map-region 802c may include the location marker 810. In one possible embodiment, the location marker 810 may be centered on the map-region 802c. An OVI 812 may reference (i.e. point to and provide information including distance, travel time, etc.) the location marker "2" 806. The location marker "2" 806 may be invisible in the map-display application 801 in FIG. 8C.

Figure 9A:
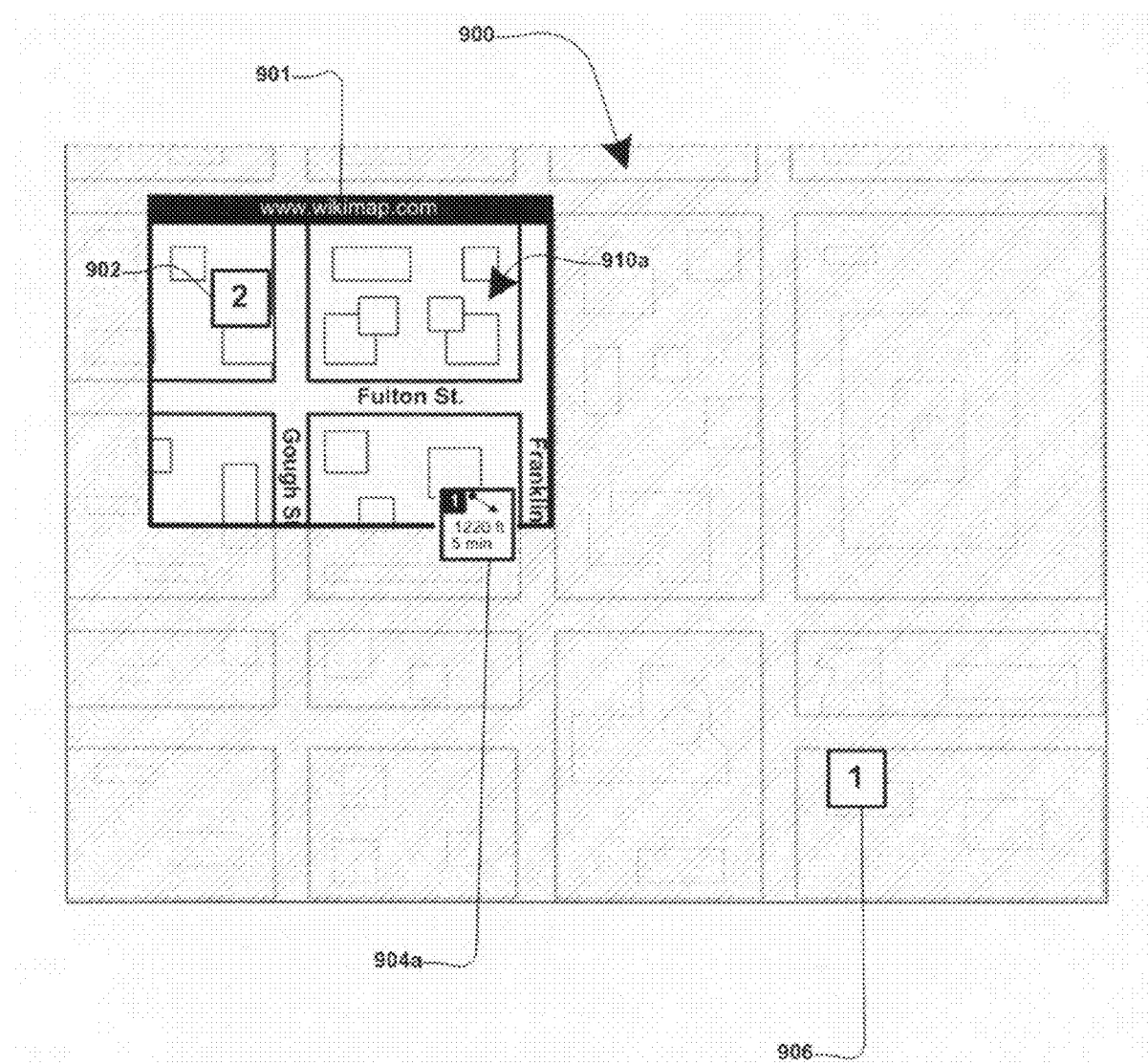
FIGS. 9A, 9B, 9C, 9D and 9E are generalized block diagrams illustrating various methods for transitioning a region of a map displayed, in conjunctions with OVIs, to allow a user to visualize the path between location markers, according to various embodiments of the present invention.
Figure 9B:
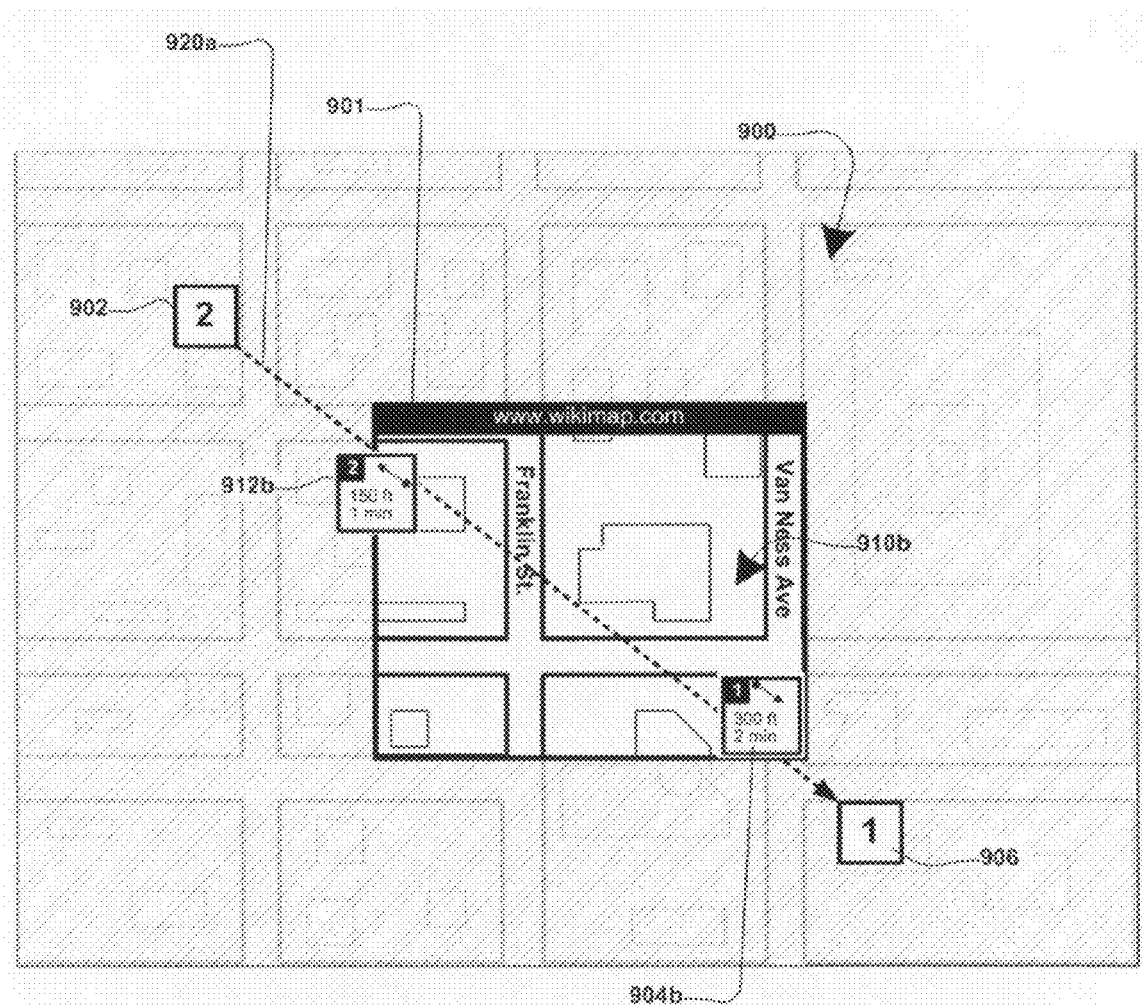
Figure 9C:
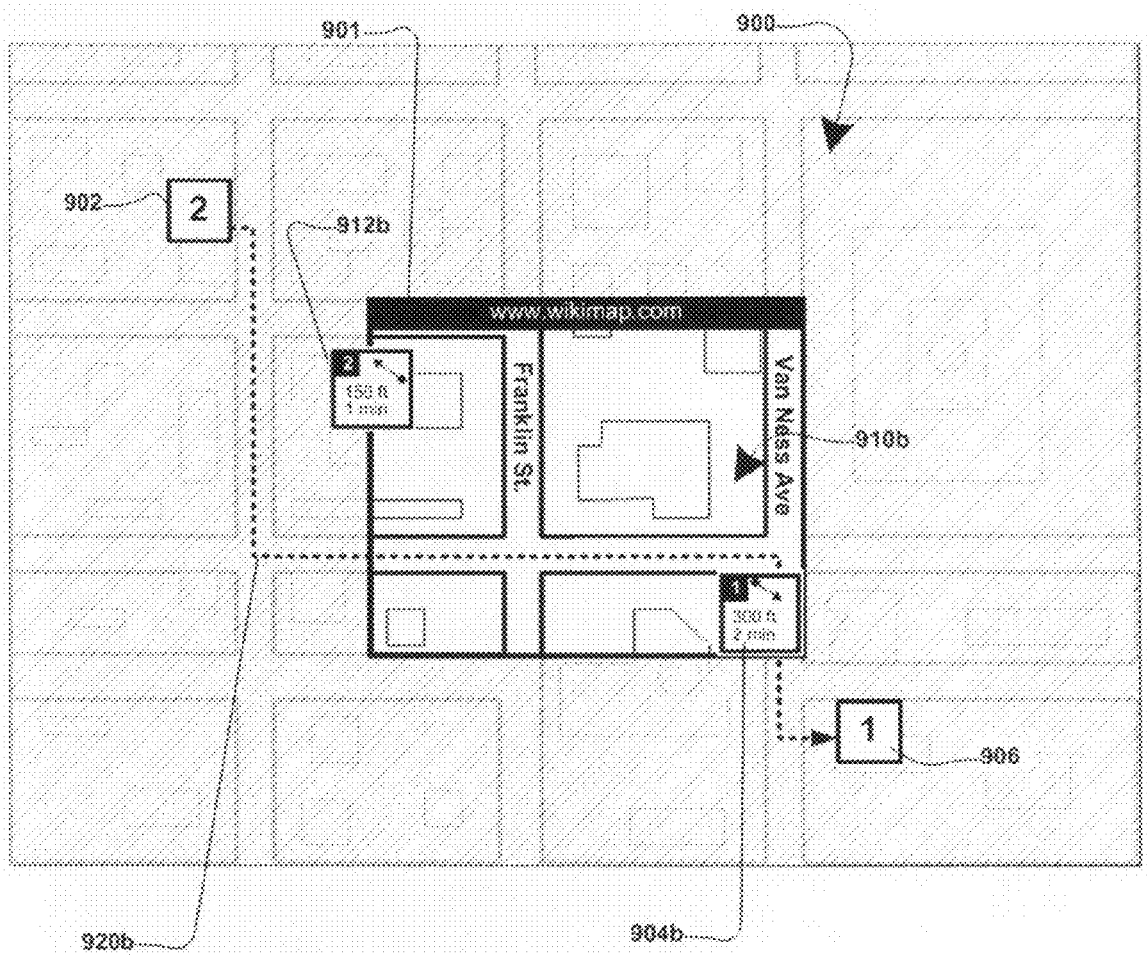

Please note that the examples in FIGS. 8A-8C show three distinct states: a map showing one location marker and one OVI, a map showing both location markers and no OVIs, and a map showing the other location marker and another OVI, pointing to the first location marker. These three distinct states are used for illustrative purposes only. In a preferred implementation, more states may be possible and the transition from one state to the next may be gradual, animated and/or time-delayed. For example, a user clicking on an OVI on a map, containing a location marker, may cause the map to slowly zoom and/or pan until the location marker referenced by the OVI is visible, in addition to the first location marker. The map may then proceed to zoom and/or pan such that the original location marker is no longer visible but is referenced by a new OVI, and the location marker referenced by the first OVI, is visible. FIGS. 9A-9C illustrate other methods of visual map transition in alternate embodiments.

FIGS. 9A, 9B, 9C, 9D and 9E are generalized block diagrams illustrating various methods for transitioning a region of a map displayed, in conjunctions with OVIs, to allow a user to visualize the path between location markers, according to various embodiments of the present invention. In response to a user's selection of an OVI, a map-display application may zoom and/or pan the map, transitioning the view from displaying a map-region including one location marker, to displaying a map-region including another location marker, referenced by the selected OVI. The map-display application transition may follow various geographic routes and may automatically return to displaying the initial map-region.

Referring to FIG. 9A, a map-display application 901 may display a map-region 910a of a map 900, which may be invisible to the user (the cross-hatching in FIGS. 9A-9E signifies portions of the map 900 not visible to the user through the map-display application 901.) The map-display application 901 may contain a location marker "2" 902, displayed overlaying the map-region 910a, and an OVI "1" 904a. The OVI 904a may reference a remote location marker "1" 906, outside the visible map-display region 910a. The map 900 may be a street map, a satellite image or any other type of electronic map.

In response to a user's input selecting the OVI 904a (e.g. via a touch screen, via an electronic imputer device, via voice-activation, etc.) an automatic transition of the region of the map 900 displayed by the map-display application 901, may be initiated. The transition may help the user visualize the geography and path from the location marker "2" 902 visible to the user, to the remote location marker "1" 906, invisible to the user and referenced by the OVI "1" 904a.

Figure 9D:
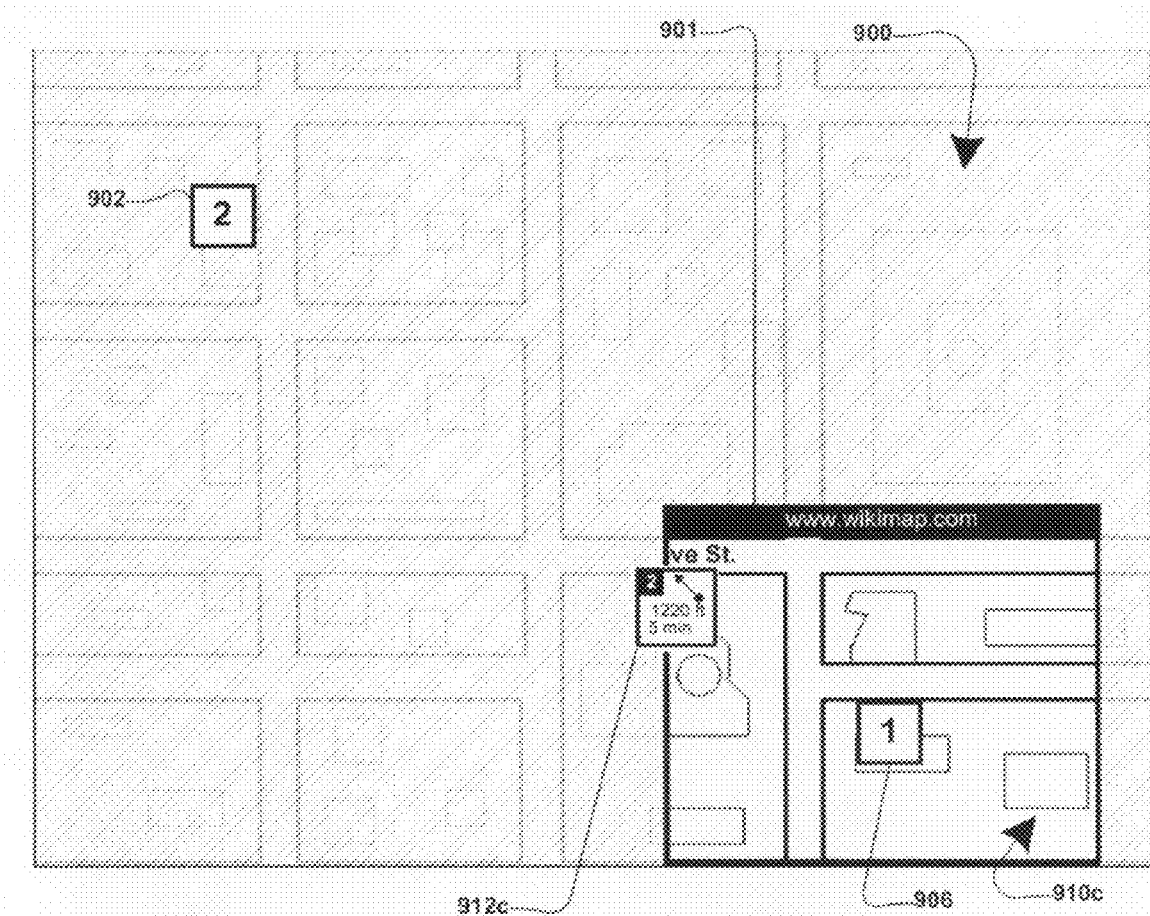

In one possible preferred embodiment, illustrated by sequence in FIGS. 9A, 9B and 9D, the transition may be along a linear path. In this embodiment, the visible region of the map 900, shown in the map-display application 901, may transition along a straight geographic path. In alternate embodiments, described in the sequence of FIGS. 9A, 9C and 9D, the transition may follow a street-path.

Referring now to FIG. 9B, the map 900 may be transitioned through the map-display application 901 along a straight imaginary line 920a, from the location marker "2" 902 to the location marker "1" 906. Throughout the transition of the map 900, the location marker "2" 902 and the location marker "1" 906, remain known to the user (i.e. the user is aware of the locations of these location markers, whether or not they are visible on the portion of the map shown in the map-display application.) In a case where the transition causes the map-display application 901 to display a map-region 910b which does not include the location markers, OVIs may be displayed. For example, the map-region 910b does not include the location makers 902 and 906, so an OVI 912b may be displayed with information referencing the invisible location marker 902 and an OVI 904b may be displayed with information referencing the invisible location marker 906. The OVIs 904b and 912b may be displayed in a positioning aligning them with the imaginary line of transition 920a.

Referring now to FIG. 9C, in an alternate embodiment, the map 900 may be transitioned through the map-display application 901 along a path 920b resembling real-life travel routes. For example, the path 920b may follow a route recommended by a guidance service (e.g. a GPS navigation device, a mapping website enabled for computing and displaying directions, etc.) In various other embodiments, the user may be offered to choose from one or more alternative routes. The routes may be computed based on real-time road and traffic conditions, etc. The speed with which the map 900 is transitioned within the map-display application 901 may be animated to mimic real travel conditions. For example, the transitioning effect may be halted briefly when the path 920b passes through a stop-sign or traffic light, etc.

Throughout the transitioning effects described in FIGS. 9B and 9C, information displayed in the OVIs may be updated in real time. For example, referring to FIG. 9C, as the map 900 transitions left, simulating the user traveling right along the path 920b (i.e. away from the location marker 902), the OVI "2" 912b may display a changed direction, increased distance and increased travel-time with respect to the location marker "2" 902 the OVI "2" 912b is referencing. Likewise, the OVI "1" 904b may display a changed direction, decreased distance and decreased travel-time with respect to the location marker "1" 906 the OVI "1" 904b is referencing.

Please note that in these examples, the travel-time change may be affected by real-time road conditions, as well as the decreased distance. In addition, please note that a map said to be traveling in a certain direction is a figure of speech—one may imagine the map being static and the map-display application shifting its view of the map causing the region of the map displayed by the map-display application to transition.

Referring now to FIG. 9D, the transition may end when a new map-region 910c, containing the location marker "1" 906, is displayed in the map-display application 901. In the presently-preferred embodiment, the map-region 910c may be selected from map 900 in such manner as to center around the location marker "1" 906. The location marker "2" 902, visible to the user in the map-region 910a in FIG. 9A, may not be visible to the user in the map-region 910c. The location marker "2" 902 may be referenced by an OVI "2" 912c, providing the user with a visual indication of the distance from, direction to and travel-time to the invisible location maker "2" 902.

Figure 9E:
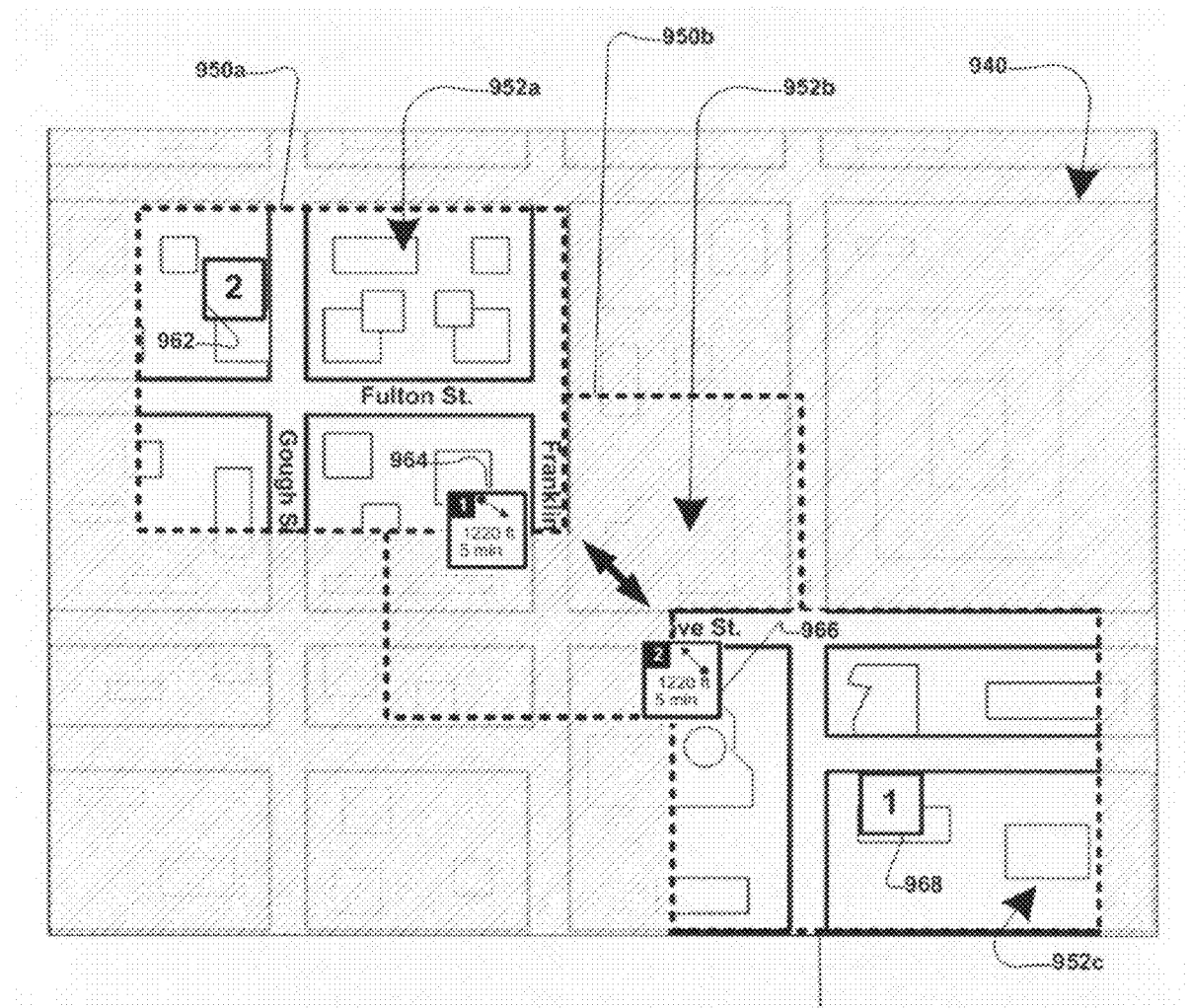

Referring now to FIG. 9E, in another embodiment, the user may be shown a simulation of travel from a visible location marker in a map-region, to an invisible location marker referenced by an OVI, and back to the original map-region showing the original location marker. For example, in a "glance mode", a region of a map, containing one or more location markers, may be visible to the user through a map-display application. Also displayed by the map-display application may be one or more OVIs referencing location markers outside the visible region of the map. The user may select one of the OVIs, in response to which the map may automatically transition within the map-display application, shifting the view of the map towards the location marker referenced by the selected OVI, and, after a possible short pause, transitioning the map in reverse back to the original view. One of the advantages of this embodiment is in giving the user a quick perspective on where another remote location marker is and how to get there, without permanently deviating from the current map view.

In this example, three phases of a map-display application are shown: a first phase where a first location marker is visible and a second location marker is not visible, and is referenced by an OVI; a second phase where neither location marker is visible and both location markers are visible by OVI; and a third phase where the first location marker is not visible and is referenced by an OVI, while the second location marker is visible. Please note that these three phases represent three arbitrary points in the transition of a map through a map-display application, and in a real-life implementation the transition may involve hundreds of phases, creating the illusion of a smooth, animated panning of a map along a travel route. In addition, please note that in this example the "travel direction" of the map is linear, whereas in other embodiments the map may transition along a travel route following streets and roads.

In the first phase, a map-display application 950a may display a map-region 952a of a map 940. The map 940 may not be visible to the user other than its map-region 952a, visible through the map-display application 950a. The map-region 952a may include a location marker "2" 962, visible to the user. The map-region 952a may include an OVI "1" 964, referencing a location marker "1" 968, not visible to the user through the map-display application 950a.

In response to a user's selecting the OVI "1" 964, an automatic map-display animation sequence may take place. The transition in the animation sequence may include one or more in-between map regions. In the second phase, the map-display application is designated 950b and may include a different region of the map 940, designated as a map-region 952b. The map-region 952b may include OVIs referencing the location markers 962 and 968, not visible in the map-region 952b.

The third phase may illustrate the final state of the map-display application, designated as 950c. The map-display application 950b may include a different region of the map 940, designated as a map-region 952c. The map-region 952c may include an OVI "2" 966 referencing the location marker "2" 962, not visible in the map-region 952c. At the end of the last phase (in this example the thirst phase) the animation sequence may reverse and the phases may be displayed in reverse order, with the last phase being the first phase where the map-display application was designated 950a and displayed the map-region designated 952a.

In an alternate embodiment, a short pause may follow the last phase, prior to the animation sequence being traversed in reverse order. In another alternate embodiment, no reverse traversing of phases may take place. For example, upon reaching the last phase a short pause may take place, in the original map-region may be displayed in the map-display application.

While the invention has been described herein with reference to certain preferred embodiments, these embodiments have been presented by way of example only, and not to limit the scope of the invention. Accordingly, the scope of the invention should be defined only in accordance with the claims that follow.

What is claimed is:

1. A method for displaying object vector indicators ("OVI") referencing map-objects ("MO") on an electronic map, comprising:
    providing an electronic device having a map-display application that is coupled to a mapping service and a display for displaying a selected area of the electronic map;
    determining that coordinates of the MO are not within the selected area of the electronic map;
    computing distance and travel-related information from a location within the selected area of the electronic map to the MO;
    computing a placement position of an OVI referencing the MO on the map-display application;
    creating the OVI containing the distance and travel-related information;
    displaying the OVI on the display at the computed placement position;
    receiving user input selecting the OVI;
    displaying a secondary area of the electronic map, wherein the secondary area is a region of the electronic map centered approximately around the MO; and
    displaying the MO approximately at the center of the secondary area.

2. The method of claim 1, wherein the location within the selected area of the electronic map is the center of the selected area of the electronic map.

3. The method of claim 1, wherein the location within the selected area of the electronic map is a location marker.

4. The method of claim 3, wherein the location marker is selected by the user.

5. The method of claim 1, wherein the user input is a voice command.

6. The method of claim 1, wherein the computing the placement position of the OVI step is repeated in response to a change in the position of the MO.

7. The method of claim 1, wherein the computing the placement position of the OVI step is repeated in response to a change in the position of the electronic device.

8. The method of claim 1, wherein the computing the distance-and-travel information includes at least one of the following: an aerial distance to the MO, a travel distance to the MO, a visual indicator pointing in the direction of the MO, and an estimated travel-time to the MO.

9. The method of claim 8, wherein the travel-distance to the MO is computed by selecting a travel route according to various user preferences and travel-route selection algorithms.

10. The method of claim 8, wherein the estimated travel-time to the MO is computed by selecting a travel route according to various user preferences and travel-route selection algorithms.

11. The method of claim 1, wherein the received user input is result of the user touching the display at a location of the display approximately corresponding to the OVI displayed.

12. The method of claim 1, wherein the computing distance-and-travel information step is repeated in response to a change in the position of the electronic device.

13. The method of claim 1, wherein the computing distance-and-travel information step is repeated in response to a change in the position of the MO.

14. The method of claim 1, wherein the computing distance-and-travel information step and the computing the placement position of the OVI step are repeated in response to a change in travel conditions.

15. The method of claim 1, wherein the computing distance-and-travel information step further comprises:
    obtaining position of the electronic device;
    transmitting the position of the electronic device to a remote server; and
    receiving from the remote server the distance-and-travel information.

16. The method of claim 1, further including:
    computing distance and travel-related information from the OVI to the selected area of the electronic map;
    computing a placement position of a second OVI referencing the selected area of the electronic map;
    creating the second OVI including the distance and travel-related information;
    displaying the second OVI on the display at the computed placement position.

17. The method of claim 1, wherein the electronic device is a GPS-enabled navigation unit.

18. A method of panning an electronic map, comprising:
    receiving a list of map objects ("MOs");
    determining the geographic coordinates of the MOs; and
    determining that the MOs are outside bounds of a first area of the map visible to a user;
    creating an object vector indicator ("OVI") for each of the MOs;
    displaying the OVIs on the electronic map;
    receiving user input selecting one of the OVIs;
    determining one of the MOs referenced by the selected OVI;
    panning the electronic map to display a secondary area of the map, wherein the secondary area is a region of the electronic map encompassing the determined one of the MOs; and
    wherein the determined one of the MOs is approximately at the center of the secondary area.

19. The method of claim 18, further comprising animating the panning transition of the electronic map from displaying the first area to displaying the secondary area, wherein the animation includes the steps of:
    a. defining a number of animation steps;
    b. defining a time delay;
    c. defining a small travel distance;
    d. determining a path between the determined one of the MOs and an approximate center of the first area of the map;
    e. panning the map by the small travel distance in the direction of the determined one of the MOs;

f. waiting an amount of time specified by the time delay;
wherein the steps e-f are repeated until the determined one of the MOs is approximately at the center of the displayed secondary map.

20. The method of claim 18, wherein creating an OVI includes calculating a distance, a direction and a travel time from a point in the first area of the map, to the location of the MO.

21. The method of claim 20, wherein the point in the first area of the map corresponds to the location of the electronic device.

22. The method of claim 18, wherein the step of panning the map by a small interval further includes:
defining a travel route; and
panning the map along the defined travel route.

23. A method for selecting information to display in an electronic map display application, comprising:
displaying a first portion of an electronic map generated by the electronic map display application;
displaying an object vector indicator ("OVI");
receiving a user input;
determining that the user input is associated with the OVI;
determining a second portion of the electronic map; and
displaying the second portion of the electronic map by the electronic map display application.

24. The method of claim 23, wherein the determining the second portion of the electronic map comprises:
determining a map object ("MO") referenced by the OVI;
determining coordinates of the MO;
panning the electronic map such that the center of the electronic map corresponds approximately to the coordinates of the MO.

25. The method of claim 23, wherein the displaying the second portion of the electronic map includes animation.

26. The method of claim 25, wherein the animation includes panning the electronic map in small intervals along a travel route until the center of the electronic map corresponds approximately to the coordinates of the MO.

27. The method of claim 26, wherein the travel route spans a distance from a point on the first portion of the electronic map to the MO.

28. A method for creating and displaying an object vector indicator ("OVI") on an electronic map of a global navigation system ("GPS") device, comprising:
a) providing the GPS device having a map display application that is coupled to a map-content service and a display for displaying a portion of the electronic map;
b) receiving coordinates of the GPS device;
c) receiving information on a map-object ("MO");
d) determining coordinates of the MO from the received information;
e) determining a range of coordinates inclusive of the displayed portion of the electronic map;
f) calculating that the coordinates of the MO are not within the range of coordinates of the displayed portion of the electronic map;
g) creating the OVI to reference the MO;
h) calculating the placement of the OVI on the display;
i) displaying the OVI on the display;
j) receiving user input selecting the OVI; and
k) panning the electronic map such that the MO is displayed approximately at the center of the electronic map.

29. The method of claim 28, wherein the step of creating the OVI includes:
calculating the direction, distance and travel-time from the position of the electronic device to the MO; and
including the calculated data in the OVI.

30. The method of claim 28, further comprising:
changing at least one of: GPS coordinates of the GPS device; MO information; a zoom-level of the electronic map.

* * * * *